US011228699B2

(12) United States Patent
Holt et al.

(10) Patent No.: US 11,228,699 B2
(45) Date of Patent: Jan. 18, 2022

(54) SYSTEMS AND METHODS FOR DETERMINING A MINIMUM RESOLVABLE DISTANCE OF AN IMAGING SYSTEM

(71) Applicant: Labsphere, Inc., North Sutton, NH (US)

(72) Inventors: Jeffrey Holt, Concord, NH (US); David Nicholas Conran, Swarthmore, NH (US)

(*) Notice: Subject to any disclaimer, the term of this patent is extended or adjusted under 35 U.S.C. 154(b) by 0 days.

(21) Appl. No.: 17/163,457

(22) Filed: Jan. 31, 2021

(65) Prior Publication Data
US 2021/0329154 A1 Oct. 21, 2021

Related U.S. Application Data

(60) Provisional application No. 63/010,275, filed on Apr. 15, 2020.

(51) Int. Cl.
*H04N 5/225* (2006.01)
*H04N 5/232* (2006.01)
*G02B 5/02* (2006.01)

(52) U.S. Cl.
CPC ....... *H04N 5/22541* (2018.08); *G02B 5/0284* (2013.01); *H04N 5/2256* (2013.01); *H04N 5/23232* (2013.01)

(58) Field of Classification Search
CPC ........... H04N 5/22541; H04N 5/23232; H04N 5/2256; G02B 5/0284
See application file for complete search history.

(56) References Cited

U.S. PATENT DOCUMENTS

| 7,499,600 | B2 * | 3/2009 | Ojanen | G06T 7/0002 |
| | | | | 356/124.5 |
| 8,158,929 | B2 | 4/2012 | Schiller | |
| 10,067,029 | B2 * | 9/2018 | Cardei | G01M 11/0292 |

(Continued)

FOREIGN PATENT DOCUMENTS

WO 2013/019180 A1 2/2013

OTHER PUBLICATIONS

Wikipedia—Optical resolution, retrieved from https://en.wikipedia.org/wiki/Optical_resolution on Jun. 14, 2021 (Year: 2021).*

(Continued)

*Primary Examiner* — Timothy J Henn
(74) *Attorney, Agent, or Firm* — Dinsmore & Shohl LLP; Monika L'Orsa Jaensson, Esq.; Bryan Walker, Esq.

(57) ABSTRACT

A method of characterizing an imaging system includes generating a plurality of point spread function ("PSF") samples using the imaging system, each PSF sample representing a response of an imaging system to a point illumination source, each PSF sample comprising one or more pixel values. The method also includes co-registering the pixel values contained in each of the plurality of PSF samples to form an oversampled point spread function ("PSF") population; resampling the oversampled PSF population to uniform spacing to form a PSF image; slicing the PSF image in an evaluation direction to form a slice of the PSF image; and evaluating the slice to determine a value of a resolution metric of the imaging system that is specific to the evaluation direction.

21 Claims, 15 Drawing Sheets

(56) References Cited

U.S. PATENT DOCUMENTS

| | | | |
|---|---|---|---|
| 2013/0027553 A1* | 1/2013 | Silny | G01J 1/08 |
| | | | 348/144 |
| 2017/0132478 A1 | 5/2017 | Modica et al. | |
| 2019/0087943 A1 | 3/2019 | Maalouf et al. | |
| 2019/0304168 A1 | 10/2019 | Korb et al. | |

OTHER PUBLICATIONS

Wikipedia—Angular resolution, retrieved from https://en.wikipedia.org/wiki/Angular_resolution on Jun. 14, 2021 (Year: 2021).*

Valenzuela, Alvaro & Reyes, Juan. (2019). Basic Spatial Resolution Metrics for Satellite Imagers. IEEE Sensors Journal. pp. 1-1. 10.1109/JSEN.2019.2902512.

George, Joseph, "How to Specify an Electro-Optical Earth Observation Camera? A Review of Terminologies Used in its Interpretation," Journal of Indian Society of Remote Sensing (Feb. 2020).

Stephen J. Schiller et al., The Specular Array Radiometric Calibration (SPARC) method: a new approach for absolute vicarious calibration in the solar reflective spectrum, Raytheon Space and Airborne Systems, 2000 East El Segundo Blvd. El Segundo, CA 90245, DOI: 10.1117/12.864071, pp. 1-19, Aug. 26, 2010.

Stephen J. Schiller et al., Using Vicarious Calibration to Evaluate Small Target Radiometry, Raytheon Space and Airborne Systems, 2000 East El Segundo Blvd. El Segundo, CA 90245, pp. 1-30, Sep. 22, 2016.

International Search Report and Written Opinion pertainig to International patent application No. PCT/US2021/025934, dated Jul. 23, 2021.

* cited by examiner

SYSTEMS AND METHODS FOR DETERMINING A MINIMUM RESOLVABLE DISTANCE OF AN IMAGING SYSTEM

CROSS-REFERENCE TO RELATED APPLICATIONS

This application claims benefit of priority under 35 U.S.C. § 119 of U.S. Provisional Application Ser. No. 63/010,275 filed on Apr. 15, 2020, the content of which is relied upon and incorporated herein by reference in its entirety.

BACKGROUND

Field

The present specification generally relates to imaging system characterization and, in particular, to systems and methods to characterizing an imaging system resolution while the imaging system is deployed in an operational environment.

Technical Background

Imaging systems, such as optical cameras and telescopes, may include imaging optics to capture light and a detector to convert the light into imaging signals to form an image. The imaging optics of the imaging system are diffraction limited based on effective aperture and wavelength of energy used to generate the image. Moreover, the imaging optics introduce some degree of distortion into the light due to optical imperfections, aberrations, and the like. Such factors of the imaging system contribute to the resolving power of the imaging system, or the imaging system's ability to distinguish between two relatively close objects. Knowledge of the resolving power of the imaging system can inform image processing and analysis. Current methods of analyzing resolving power may be based on simulations that assume symmetry of the resolving power, or assume that the resolving power of the imaging system is the same irrespective of the relative positioning of the objects being resolved to the imaging system's axis. Current methods may also fail to account for the resolving power of the imaging system changing over the course of use due to optical degradation and other factors.

Accordingly, an alternative approach for characterizing resolving power that addresses these deficiencies of existing approaches is needed.

SUMMARY

According to an embodiment of the present disclosure, a method of characterizing an imaging system includes generating a plurality of point spread function ("PSF") samples using the imaging system, each PSF sample representing a response of an imaging system to a point illumination source, each PSF sample comprising one or more pixel values. The method also includes co-registering the pixel values contained in each of the plurality of PSF samples to form an oversampled point spread function ("PSF") population; resampling the oversampled PSF population to uniform spacing to form a PSF image; slicing the PSF image in an evaluation direction to form a slice of the PSF image; and evaluating the slice to determine a value of a resolution metric of the imaging system that is specific to the evaluation direction.

Another embodiment of the present disclosure includes a method of characterizing an imaging system, the method comprising: generating a point spread function ("PSF") image of an imaging system; generating a plurality of slices of the PSF image, each of the plurality of slices extending in an evaluation direction that differs from that of the other slices; evaluating each of the slices by duplicating each of the plurality of slices and translating each slice relative to that slice's duplicate along the evaluation direction associated with that slice to determine a minimum resolvable distance of the imaging system along the evaluation direction; and plotting the minimum resolvable distance as a function of evaluation direction to generate an imager fingerprint of the imaging system.

Another embodiment of the present disclosure includes a system comprising one or more processors and one or more non-transitory memory modules communicatively coupled to the one or more processors and storing machine-readable instructions. When executed, the machine-readable instructions cause the one or more processors to: receive a plurality of point spread function ("PSF") samples generated via an imaging system, each PSF sample representing a response of an imaging system to a point illumination source, each PSF sample comprising one or more pixel values; co-register the pixel values contained in each of the plurality of PSF samples to form an oversampled PSF population; resample the oversampled PSF population to uniform spacing to form a PSF image; slice the PSF image in an evaluation direction to form a slice of the PSF image; and evaluate the slice to determine a value of a resolution metric of the imaging system that is specific to the evaluation direction.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
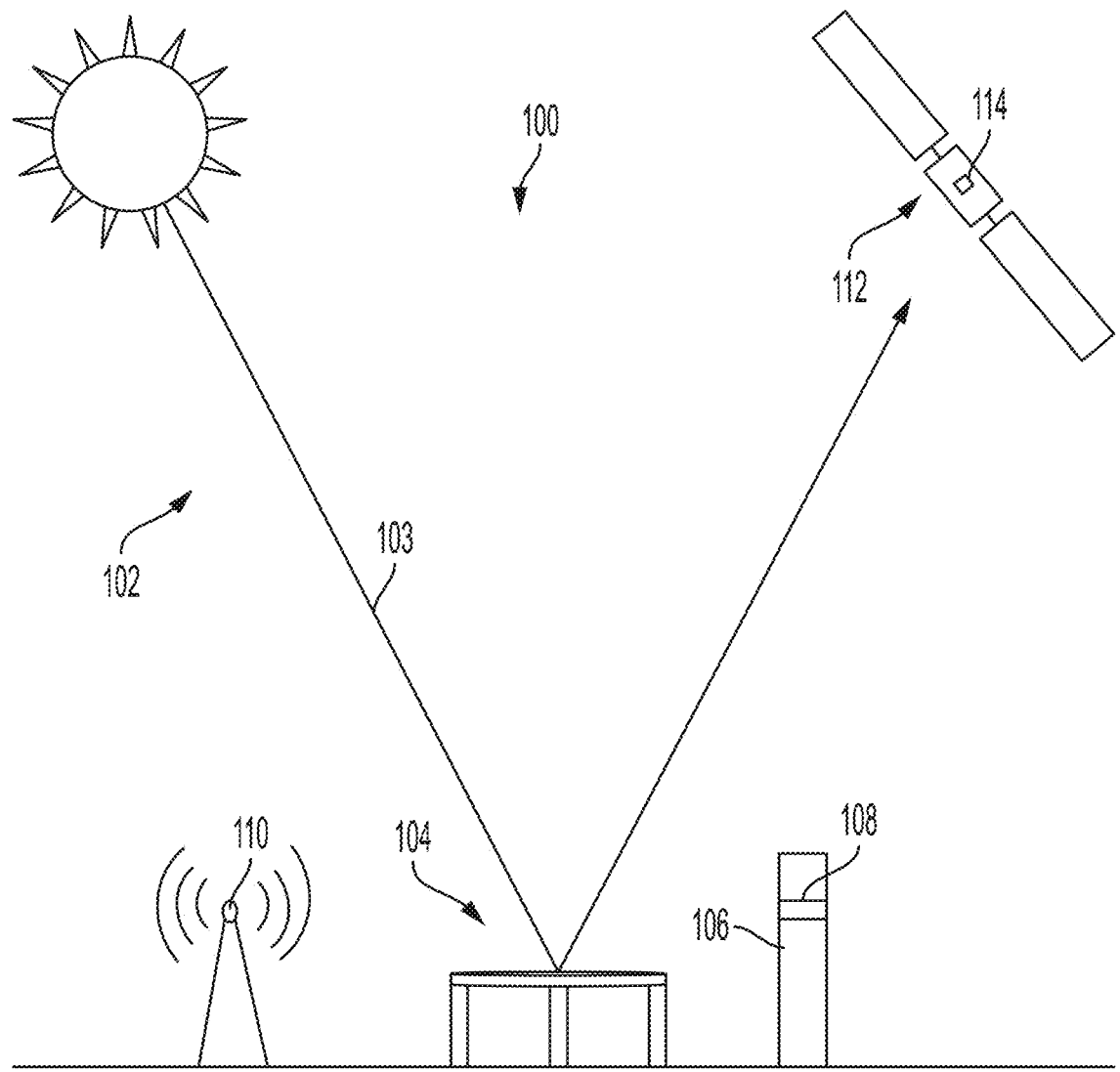
FIG. 1A schematically depicts an imager characterization system, according to one or more embodiments described herein.

Reference will now be made in detail to embodiments of systems and methods for evaluating performance criteria of an imaging system in real-time. The methods described herein include generating a surface representing an image (e.g., a super-resolution point spread function ("PSF") surface, an oversampled PSF population, a resampled oversampled PSF population) of a PSF of the imaging system (a "PSF image"), taking a plurality of angular slices of the PSF image, and evaluating each of the angular slices with performance criteria to characterize the performance of the imaging system. For example, in embodiments, each of the angular slices is evaluated with respect to Rayleigh criteria (e.g., Rayleigh Diffraction Limit) to determine a plurality of angular minimum separation distances describing the resolving power of the imaging system as a function of azimuthal angle relative to the imaging system's axis. In embodiments, the plurality of angular minimum separation distances may be plotted as a function of azimuthal angle to form a two-dimensional fingerprint of the imaging system based on the characteristics described by the PSF image. In embodiments, the plurality of angular minimum separation distances may be compared to ideal diffraction-only-driven Rayleigh Diffraction Limits ("RDL") to determine a quality of the imaging system. A similar process may be performed with respect to other performance criteria (e.g., ground resolvable distances, ground spot size, ground sample distance, Sparrow limit, and the like). Using the systems and methods described herein, measurements of the resolving power of the imaging system may be taken in real-time during deployment of the imaging system to provide quality assessments incorporating degradation of the imaging system during use.

Additionally, the systems and methods described herein include a method of generating an over-sampled PSF population that more accurately reflects a measured imaging system response to the one or more illumination point sources than existing methods. The systems and methods may collect a plurality of samples of a point illumination source of the imaging system (referred to herein as "PSF samples"), with each of the plurality of PSF samples including a plurality of pixel values. Each of the pixel values of each PSF sample may have a different pixel phasing and provide a relatively inaccurate approximation of where a signal peak of the point source is on the pixel array. Given this, the plurality of PSF samples may be co-registered with one another using an optimization technique (e.g., a differential evolution algorithm) that allows a plurality of parameters (e.g., background parameters, such as tilted plane offset, background amplitude, background slope, and the like, surface parameters, and normalization parameters) to float to satisfy any objective function of choice to fit surfaces to each of the plurality of pixel values of each PSF sample for co-registering. That is, the systems and methods described herein provide operational degrees of freedom to define surfaces for co-registering the plurality of PSF samples in a manner that accurately reflects each of the plurality of PSF samples in accordance with a flexible error minimization directive. Once the plurality of PSF samples are co-registered, the systems and methods include generating a PSF image using the over-sampled PSF. For example, the systems and methods described herein may define a parametric or non-parametric PSF surface as the PSF image using three-dimensional interpolation techniques. Beneficially, the PSF image contains a higher resolution characterization of the imaging system's PSF to facilitate further processing. For example, the PSF image may be sliced in a plurality of angular slices to determine a radially resolvable power distribution for the imaging system. The high resolution PSF image enhances accuracy of the determination and allows for complete angular characterization of the imaging system's resolving power.

FIG. 1A schematically depicts an imager characterizing system 100, according to an example embodiment. The imager characterization system 100 includes an illumination source 102, a reflector array 104, a control system 106, and an imaging system 112. The illumination source 102 provides illumination light for generating samples for characterizing the imaging system 112. In the example shown, the illumination source 102 is sunlight, though other illumination sources are contemplated and within the scope of the present disclosure. In embodiments, the reflector array 104 and control system 106 comprise one of a plurality of reference sites that are a part of a calibration network for characterizing the imaging system 112.

The control system 106 communicates with the imaging system 112 via antennas 110 and controls the reflector array 104. In embodiments, the imager characterization system 100 provides on-demand calibration for the imaging system 112 in response to a calibration request. For example, in embodiments, the imaging system 112 transmits the calibration request to the imager characterization system 100 (e.g., via any known communication protocol). The calibration request may indicate a calibration time when the reflector array 104 is within a field of view of the imaging system 112. At the indicated time, the control system 106 may measure solar radiance, irradiance, atmospheric transmission, and reflectance from the reflector array 104 and control the reflector array 104 to direct illumination light 103 from the illumination source 102 to the imaging system 112 for calibration. The spectral radiance and/or irradiance of the illumination source 102 (e.g., of the sun and sky), atmospheric transmission, and the like may be measured by one or more radiometers 108 incorporated into the control system 106. In embodiments, the one or more radiometers 108 is adjustable relative to the control system 106 such that the field of view of the one or more radiometers 108 is adjustable and the irradiance and/or radiance of the illumination source 102 can be measured from a plurality of different orientations to enable the control system 106 to acquire a complete survey of the environment. In embodiments, in addition to the one or more radiometers 108 the control system 106 includes a camera (not depicted). The camera may be co-located with the radiometer 108 and used for alignment, tracking, and targeting to ensure that the one or more radiometers 108 is sampling a desired target. In embodiments, the camera may be used to evaluate a transmission path for obstructions (e.g., clouds). The camera may be used to identify obstruction of propagation paths extending between the illumination source 102, the reflector array 104, and the imaging system 112 (e.g., a first propagation path for light from the illumination source 102 to reach the reflector array 104 and a second propagation path for light from the reflector array 104 to reach the imaging system 112).

The imaging system 112 is depicted as a satellite imaging system, but it should be understood that the systems and methods described herein are applicable to any airborne imaging system (e.g., imaging systems disposed on unmanned aerial vehicles or other aircraft). In the depicted embodiment, the imaging system 112 includes one or more detectors 114. The one or more detectors 114 are generally configured to generate images based on radiation within a wavelength range of interest. The wavelength range of interest may vary depending on the implementation. For example, in embodiments, the one or more detectors 114 may generate images based on one or more of ultraviolet radiation, visible light, infrared radiation, and even the millimeter wavelength range or radio frequency, depending on the implementation.

Figure 1B:
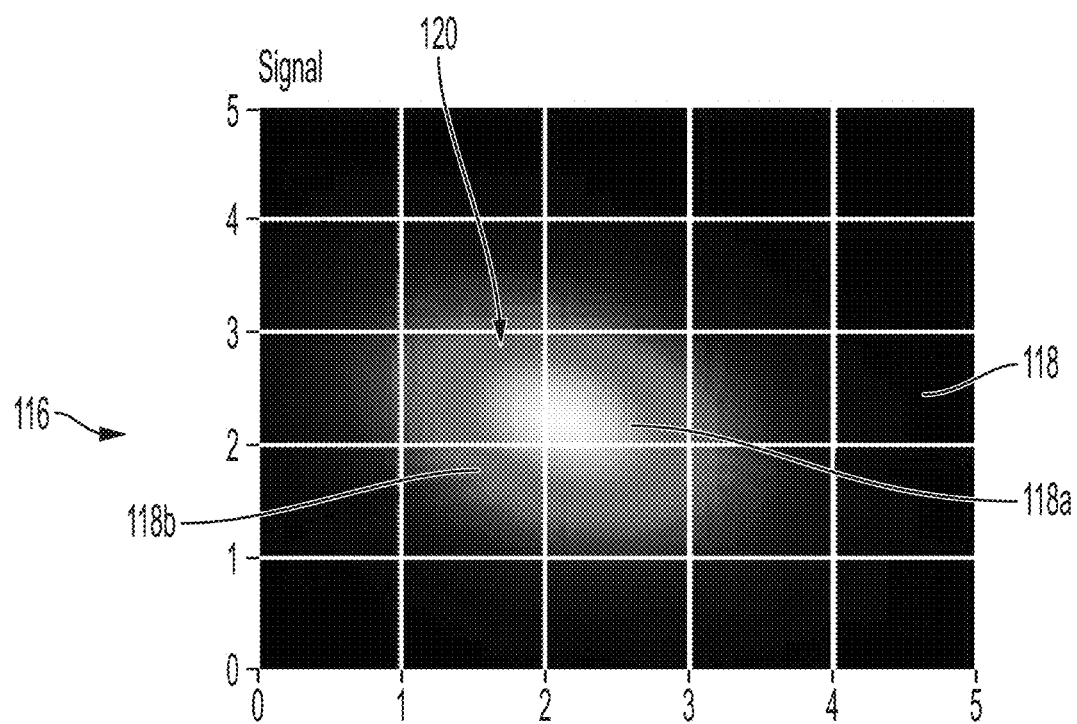
FIG. 1B schematically depicts a pixel array of a detector of an imaging system with an illumination signal incident thereon, according to one or more embodiments described herein.

Referring to FIG. 1B, in embodiments, the imaging system 112 includes a pixel array 116. In embodiments, the pixel array 116 is a component of the detector 114 of the imaging system 112 described herein with respect to FIG. 1A. The pixel array 116 includes a plurality of pixels 118 that generate individual imaging signals based on an amount of illumination light 103 from the illumination source 102 that is incident thereon. For example, in embodiments, each of the plurality of pixels 118 is a charge coupled device that generates an electrical signal having a magnitude dependent on the illumination that is incident thereon. It should be understood that FIG. 1B is simplified for purposes of discussion herein and the pixel array 116 may include any number of pixels arranged in any manner. FIG. 1B depicts an illumination signal 120 that is incident on the imaging system 112. The illumination signal 120 may correspond to illumination light reflected by a reflector of the reflector array 104 (e.g., the illumination signal 120 represents light reflected from only one of the reflectors of the reflector array 104). In embodiments, the electrical signal generated by each of the pixels 118 may have a magnitude that is based on a portion of the illumination signal 120 that is contained within the boundary of that pixel. Accordingly, as depicted, a first one of the pixels 118a may generate a larger electrical signal than a second one of the pixels 118b, as more of the illumination signal 120 is incident on the first pixel 118a than the second pixel 118b.

Figure 1C:
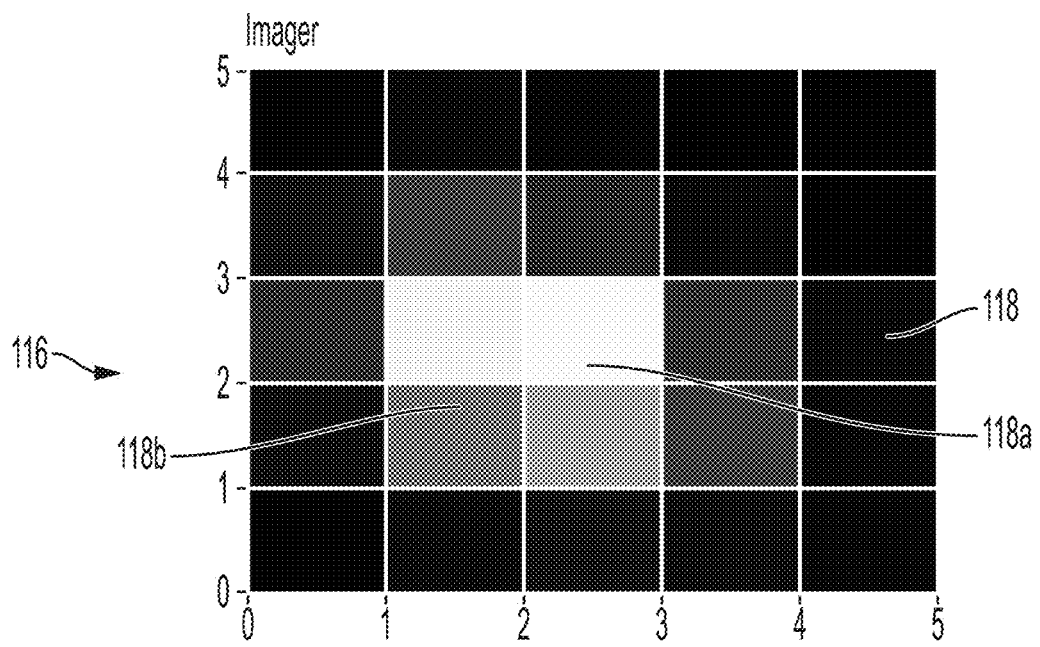
FIG. 1C schematically depicts a relative magnitude of the electrical signals generated by each of the pixels of the pixel array of FIG. 1B in response to the illumination signal, according to one or more embodiments described herein.

In embodiments, the plurality of electrical signals generated by the pixel array 116 are assigned to locations in an image that is generated by the imaging system 112. FIG. 1C depicts the relative magnitude of the electrical signals generated by each of the pixels 118 in response to the illumination signal 120 depicted in FIG. 1B. An image location corresponding to the first pixel 118a may be assigned a higher signal value than an image location corresponding to the second pixel 118b because more of the illumination signal 120 is incident on the first pixel 118a. In embodiments, the imaging system 112 assigns the electrical signals to imaging locations associated with centers of each of the pixels 118. As shown, in comparing FIG. 1C to FIG. 1B, such an approach may result in the image that does not accurately reflect the relative positioning of the illumination signal 120 on the pixel array 116. As depicted in FIG. 1B, the illumination signal 120 has a peak at a lower left hand corner of the first pixel 118a. Assigning the electrical signal value to an image location associated with a center of the first pixel 118a misplaces the peak intensity value of the illumination signal 120. As such relative alignment between the illumination light 103 and each pixel on the pixel array has the potential to impact generated image signals and the resolving power of the imaging system 112.

Figure 2A:
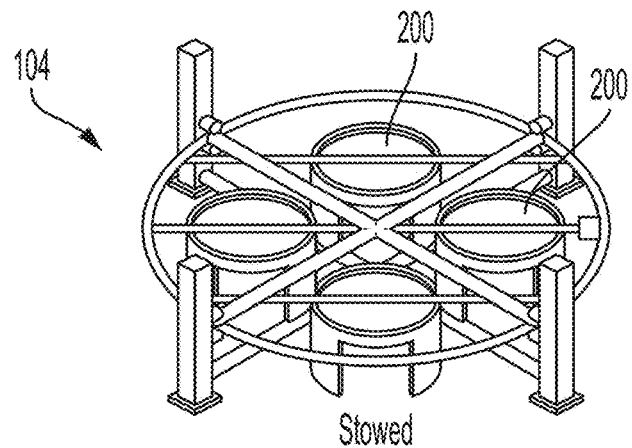
FIG. 2A depicts a reflector array of the imager characterization system of FIG. 1A with a plurality of reflectors in a closed state, according to one or more embodiments described herein.
Figure 2B:
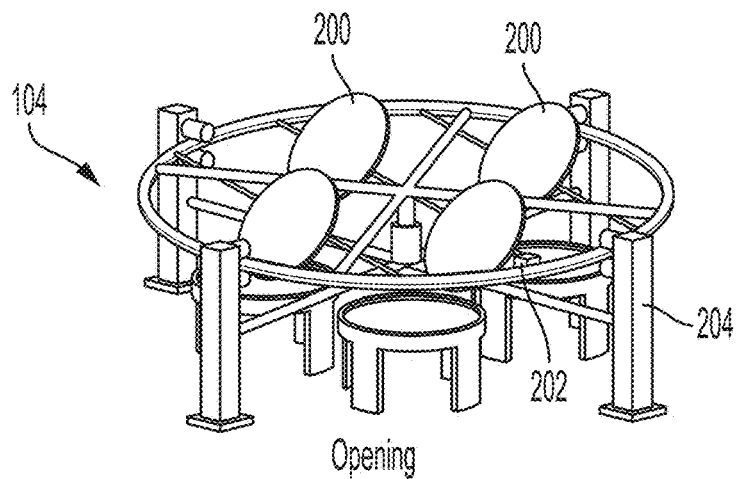
FIG. 2B depicts the reflector array of FIG. 2A in an opening state where the plurality of reflectors are being adjusted to an imaging position, according to one or more embodiments described herein.
Figure 2C:
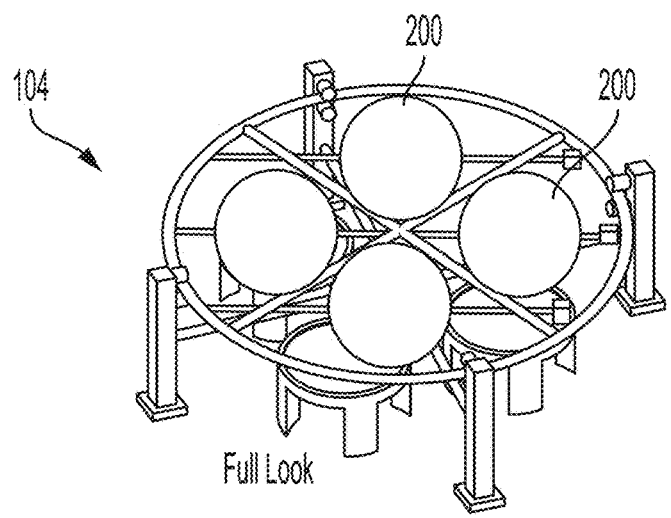
FIG. 2C depicts the reflector array of FIG. 2A in an imaging position where the plurality of reflectors direct light from an illumination source to an imaging system being characterized by the imager characterization system of FIG. 1A, according to one or more embodiments described herein.

FIGS. 2A, 2B, and 2C schematically depict an example embodiment of the reflector array 104 in greater detail. FIG. 2A depicts the reflector array 104 in a closed state where light from the illumination source 102 is not reflected towards the imaging system 112. FIG. 2B depicts the reflector array 104 in an opening state where the reflector array 104 is being adjusted based on locations of the imaging system 112 and the illumination source 102. FIG. 2C depicts the reflector array 104 in a calibration mode where the reflector array is positioned to direct light from the illumination source 102 into the field of view of the imaging system 112. In the depicted embodiment, the reflector array 104 includes a plurality of reflectors 200. The plurality of reflectors 200 are arranged in a 2×2 array, although other arrangements and numbers of reflectors are contemplated and within the scope of the present disclosure.

In embodiments, each reflector 200 of the reflector array 104 is similarly shaped and sized. Each reflector 200 may be concave, convex, or flat, depending on the implementation. In embodiments, each reflector 200 is sized less than an instantaneous geometric field of view ("IGFOV") of one of the plurality of pixels 118 of the imaging system 112. That is, each of the reflectors 200 may have a surface area facing the illumination source 102 that is less than or equal to a geometric area captured by one of the plurality of pixels 118 of the detector 114. In embodiments, the IGOV of one of the plurality of pixels may be approximated as $$IGFOV = \frac{ah}{f} \quad (1)$$

where a represents the dimension of one of the pixels 118 (e.g., in embodiments where each of the plurality of pixels 118 is an a x a square, f is the effective focal length of an optical system (not depicted) of the imaging system 112, and h is the height of the optical system above of the reflector array 104 (e.g., the orbital height of the imaging system 112). That is, light reflected from each of the reflectors 200 may represent a point illumination source that is imaged by the imaging system 112. In embodiments, the reflector array 104 includes a plurality of arrays of reflectors within a single IGFOV of the imaging system 112.

Referring to FIG. 2B, in embodiments, each of the plurality of reflectors 200 is coupled to a support platform 202 via an actuator (not depicted). The actuator may rotate each reflector 200 responsive to control signals received from the control system 106 (see FIG. 1) to position the reflectors 200 to reflect light from the illumination source 102 towards the imaging system 112 to generate an image of a point illumination source. In embodiments, when not being used to calibrate the imaging system 112, the reflectors 200 are positioned in direct contact with one of the support platforms 202 to protect the reflective surfaces of the reflectors 200 while not in use (see FIG. 2A). The support platforms 202 are integrated into a support structure 204 that provides structural support for the reflector array 104.

Figure 3A:
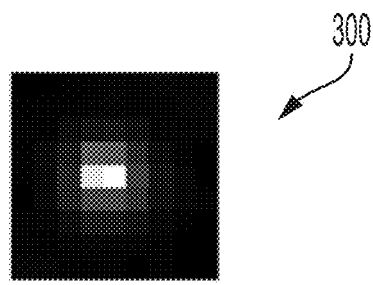
FIG. 3A depicts a first image of a point illumination source captured by the pixel array of FIG. 1B, according to one or more embodiments described herein.

Even though each of the plurality of reflectors 200 is smaller than the IGFOV of the imaging system 112, illumination light 103 reflected by one of the reflectors 200 may be spread across a number of different pixels 118 of the pixel array 116 of the imaging system 112 due to distortions and the like that are present in the imaging system 112. Moreover, movement of the imaging system 112 relative to the reflector array 104 during imaging may impact performance of the imaging system in non-symmetric ways. For example, FIG. 3A depicts a first PSF sample 300 generated via the imaging system 112 generated from light reflected by one of the reflectors 200. As shown, the PSF sample 300 includes a plurality of pixel values, with the highest intensity of light being captured at two pixels in a central row of the pixel array 116. Based on such information, it is difficult to ascertain where a peak illumination intensity was incident on the pixel array 116 because each of the two pixels in the central row have the same recorded value.

Figure 3B:
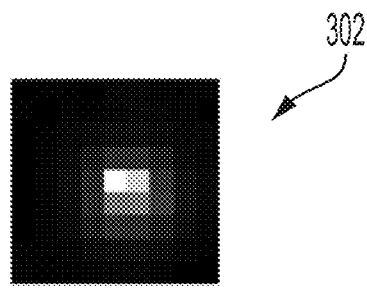
FIG. 3B depicts a second image of a point illumination source captured by the pixel array of FIG. 1B, according to one or more embodiments described herein.

FIG. 3B depicts a second PSF sample 302 generated via the imaging system 112 with light from reflected by the same reflector 200 as that used to generate the first PSF sample 300 depicted in FIG. 3A. In the second PSF sample 302, the peak pixels are shifted upwards by a row on the pixel array 116, and a single pixel possesses a peak intensity value, as opposed to a pair of pixels possessing the peak intensity value in FIG. 3A. That is, the first and second PSF samples 300 and 302 contain different phasing and indicate different shapes for a point spread function of the imaging system 112. Due to the process of pixel resampling, the relative positioning between the peak intensity of the point illumination and pixel boundaries impacts the distribution of pixel values in each sample. Due to non-symmetrical effects of imaging system 112 motion and the impact of relative alignment between the illumination signal and pixel boundaries on PSF sampling, it is beneficial to obtain a plurality of PSF samples to generate an oversampled PSF population to gain a more accurate characterization of the PSF of the imaging system 112.

In view of the foregoing, referring back to FIGS. 1A and 2A-2C, to accurately characterize a PSF of the imaging system 112, more than one image of one of the reflectors 200 (see FIGS. 2A-2C) of the reflector array 104 may be captured to generate the oversampled PSF population. For example, as the imaging system 112 travels with respect to the reflector array 104, the imaging system 112 may capture a plurality of samples of illumination light from the illumination source 102 reflecting off of the same reflector 200 to generate a plurality of samples. Alternatively or additionally, a plurality of reflector arrays 104 may be situated within the field of view of the imaging system 112 and each of the reflector arrays 104 may sequentially reflect light from the illumination source 102 towards the imaging system 112 in separate frames to generate a plurality of samples. Once the plurality of samples have been captured, the plurality of samples may be co-registered to generate an oversampled PSF population.

Figure 4:
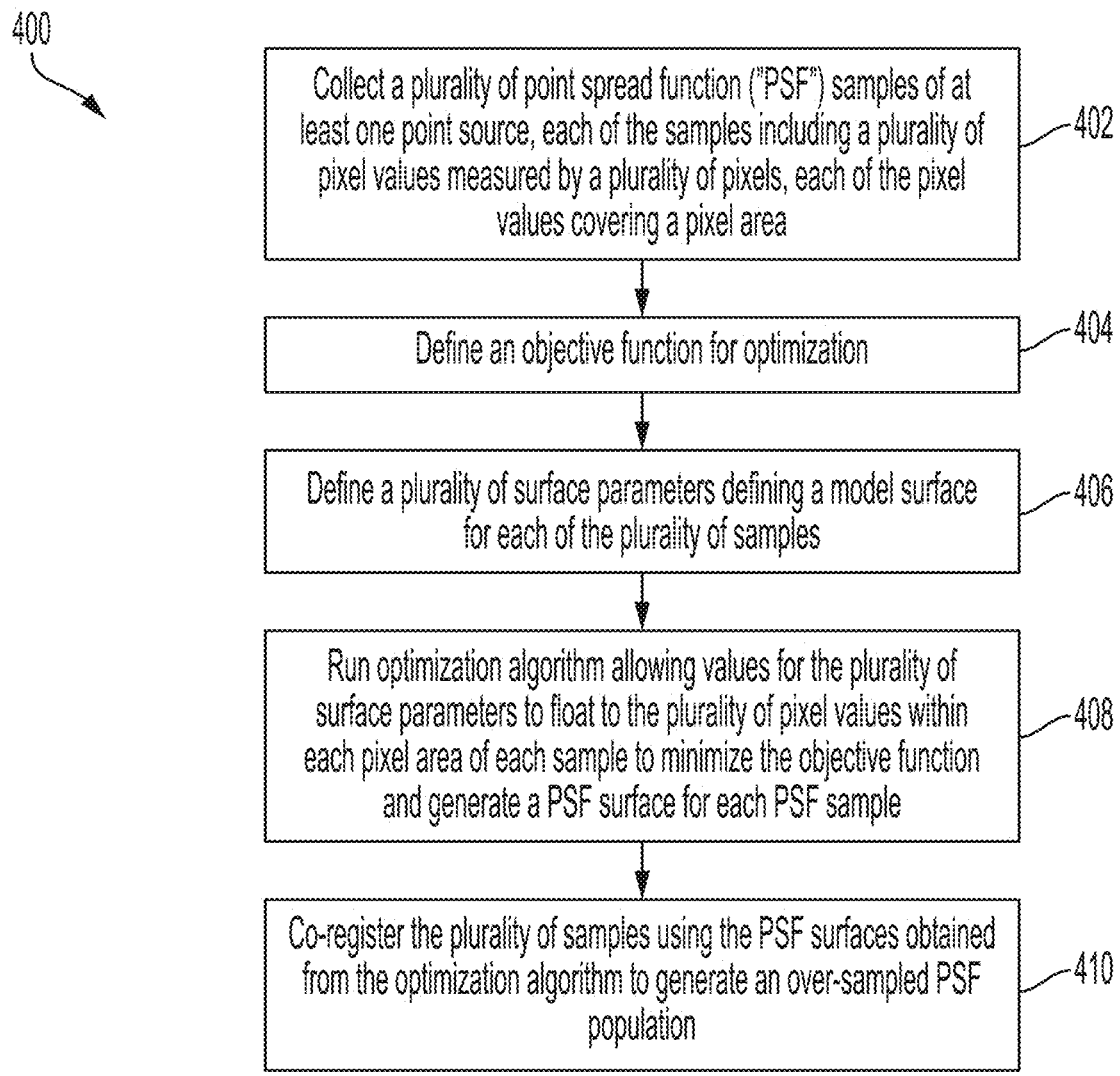
FIG. 4 depicts a flow diagram of a method of co-registering a plurality of point spread function ("PSF") samples to generate an oversampled PSF population, according to one or more embodiments described herein.

FIG. 4 depicts a flow diagram of a method 400 of generating an over-sampled PSF population. In embodiments, the method 400 may be performed by the image processing system associated with the imaging system 112 described with respect to FIG. 1A (e.g., the image processing system 1200 described herein with respect to FIG. 12). In embodiments, the method 400 is performed by a system that is separate from the imaging system 112 (e.g., by the control system 106 described with respect to FIG. 1A or any other computing system in communication with the imaging system 112). Performance of the method 400 facilitates the generation of an accurate over-sampled PSF population to facilitate analysis of the imaging system 112 in real-time during deployment. The term "co-registration," as used herein is a process whereby a plurality of PSF samples generated by an imaging system (such as the imaging system 112) are co-located into a single coordinate space, background subtracted, and amplitude normalized.

In a step 402, the imaging system 112 collects a plurality of PSF samples of at least one point illumination source. As described herein, the control system 106 of the imager characterization system 100 may receive a calibration request from the imaging system 112 and control the reflector array 104 to an orientation such that the reflectors 200 reflect illumination light from the illumination source 102 towards the imaging system 112 within the field of view of the imaging system 112. Since each of the reflectors 200 are smaller than the IGFOV of one of the pixels 118 of the pixel array 116 of the imaging system 112, such illumination light incident on the imaging system 112 represents a PSF sample. As described herein, such a PSF sample may result in energy from the illumination light being incident on a plurality of the pixels 118 of the pixel array 116 of the imaging system 112. Thus, the PSF sample may include a plurality of pixel values.

To capture a plurality of samples, a number of different techniques may be used. In embodiments, the imaging system 112 captures a plurality of frames of the reflector array 104 while the reflector array 104 remains in the same configuration as the imaging system 112 travels relative to the reflector array 104 to generate a plurality of different PSF samples. In embodiments, the control system 106 may alter the orientation of the reflectors 200 between collections of PSF samples. In embodiments, a plurality of different reflector arrays 104 are used to successively reflect illumination light to the imaging system 112 in a predetermined pattern to generate a plurality of PSF samples.

Each pixel value of the PSF samples represents the integrated intensity of the illumination light incident on a particular one of the pixels 118 of the pixel array 116. The method 400 may differ from existing co-registration methods in that the method 400 does not assign each pixel value to a particular location within the pixel 118 that recorded that pixel value. For example, existing methods may assign each pixel value to a point in the center of each of the pixels 118 that collected illumination light within the PSF sample. Such an approach may lead to information regarding peak of the illumination signal being lost, as the peak may not be incident at the center of a particular pixel, but rather at a boundary between a plurality of pixels, as described herein with respect to FIGS. 1A and 1B. To avoid the loss of such location information, the method 400 does not assign each pixel value to a particular point within each pixel 118 but rather assigns the pixel value to the entire pixel area of each pixel 118 and allows later steps of the method 400 to further refine the location to which each pixel value is assigned for each PSF sample.

In a step 404, the control system 106 (or other computing system associated with the imaging system 112) defines an objective function for optimization. In embodiments, in order to co-register the plural of PSF samples collected during the step 402, surface functions are defined to determine the amplitude and location of a particular reference point (e.g., peak) of each PSF sample (e.g., to determine the relative position or offset of the reference point). Each surface function may include a plurality of parameters that are tailored to fit the plurality of pixel values associated with a PSF sample. The objective function may define a standard through which a particular set of parameters used to define the surface are evaluated. The objective function may take a number of forms depending on the implementation. In embodiments, the objective function may be a root mean square (RMS) fitting function (e.g., single or weight contribution RMS fit). For example, the objective function may be computed as $$RMS = \sqrt{\frac{\sum_{i=1}^{n}(F(x_i,y_i) - \text{Pixel Value}(x_i,y_i))^2}{n}} \quad (2)$$

where F represents a function fit to a particular PSF sample, $x_i$ and $y_i$ represent the location within a particular pixel, and $i=1, \ldots, n$, with n being the number of pixels on the pixel array. Various other objective functions may be used depending on the implementation. In embodiments, the objective function may define a threshold value for the RMS, indicating a maximum total RMS error between function F and the actual measured pixel values of each PSF sample. In embodiments, rather than being associated with the fit between a function and a particular PSF sample, the objective function may measure a total error between a plurality of functions and a plurality of PSF samples.

In a step 406, the imaging system 112 defines a plurality of surface parameters for a model surface for each of the plurality of PSF samples. As will be appreciated, the particular parameters that are defined for the model surface may depend on the implementation or the particular surface used. For example, in embodiments, a two-dimensional rotated Gaussian surface model may be used, in which case parameters defining an amplitude, a central position (e.g., both in the x-direction and the y-direction), directional spreads (e.g., in both the x-direction and the y-direction), rotations of the model's major axis with respect to a frame of the imaging system 112, and background parameters (e.g., defining an amplitude of background noise in a PSF sample and a slope of the background noise in both the x-direction and the y-direction) may be included in the model surface. It should be understood that completely different parameters may be defined depending on the particular model surface that is selected. Alternative model surfaces (such as a Lorentzian function, a Moffat function, or the like) may be used consistent with the present disclosure.

In a step 408, the imaging system 112 runs an optimization algorithm allowing values for the plurality of surface parameters defined in the step 406 to float to the plurality of pixel values within each pixel area measured during the step 402. In embodiments, the imaging system 112 utilizes a differential evolution approach wherein each surface parameter defined in the step 406 is used to generate a parameter vector including a random distribution of values for that surface parameter within a range of values for that surface parameter between an upper bound and a lower bound. For each PSF sample, initial values within each surface parameter value may be selected to generate an initial PSF surface for that PSF sample. The initial surface parameters may be updated by creating three sub-vectors for each surface parameter vector, and adding a scaled difference between two of the three sub-vectors to a third one of the three sub-vectors to create a donor vector. Random values in each one of the initial parameter vector and the donor vector are then selected to create a trial vector of surface parameters from which updated values for each surface parameter are selected to generate updated PSF surfaces for each of the PSF samples. The initial and updated PSF surfaces may each be evaluated using the objective function defined during the step 406. The initial or updated PSF surface is then selected based on the evaluation in accordance with the objective function, and further updated by updating the parameter values selected in the trial vector. Such a method may repeat until predetermined divergence criteria (e.g., number of iterations, rate of convergence, and the like) are satisfied to generate PSF surfaces for each PSF sample collected during the step 402. Alternative optimization techniques, such as convolutional neural networks may also be used.

In a step 410, the imaging system 112 co-registers the plurality of samples using the PSF surfaces for each PSF sample generated in the step 408. For example, in embodiments where the plurality of surface parameters defined during the step 406 define a two-dimensional rotated Gaussian surface model, each PSF surface may define an amplitude for each PSF sample, a central position (e.g., both in the x-direction and the y-direction) of a PSF sample, directional spreads (e.g., in both the x-direction and the y-direction) of a PSF sample, and background parameters (e.g., defining an amplitude of background noise in a PSF sample and a slope of the background noise in both the x-direction and the y-direction). In embodiment, to co-register each of the PSF samples, the amplitudes thereof are normalized relative to a reference amplitude. For example, the reference amplitude may normalize a maximum amplitude of the plurality of PSF samples (as indicated by the maximum amplitude of the plurality of PSF surfaces) by scaling each pixel value in each of the PSF samples (e.g., with "1" representing the maximum amplitude). Additionally, a center position within the detector 114 may be defined and each of the plurality of pixel values may be moved to the center position based on their offset to center (as indicated by the PSF surface) and the background associated with each PSF sample (as indicated by the surface parameter values indicative of background noise) may be subtracted form the plurality of pixel values. As a result of the co-registration, each of the plurality of pixel values of each PSF sample has been co-located relative to a fixed reference point, normalized with respect to a reference amplitude, and background-subtracted to form an oversampled PSF population. It should be understood that the method 400 depicts only one representative method for generating an oversampled PSF population and existing methods may be used consistent with the present disclosure.

Figure 5:
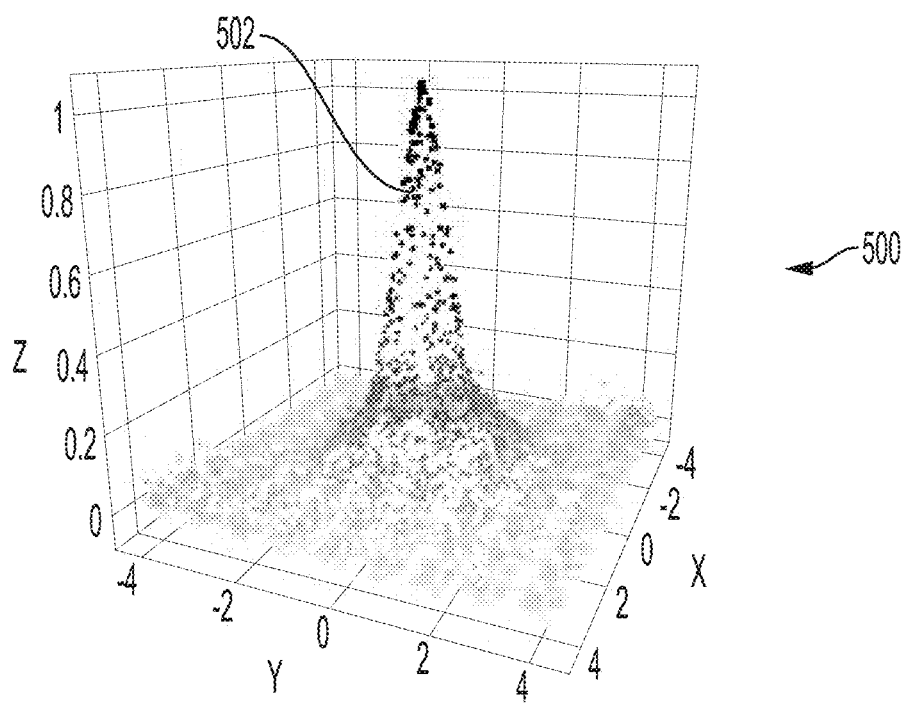
FIG. 5 depicts an oversampled PSF population generated via the method depicted in FIG. 4, according to one or more embodiments described herein.

FIG. 5 depicts an example oversampled PSF population 500 obtained via performance of the method 400. The oversampled PSF population 500 includes a plurality of co-registered pixel values 502 that are associated with different PSF samples that have been normalized for amplitude, co-located, and background subtracted. Due to the surface fitting process of steps 406 and 408 of the method 400, each of the co-registered pixel values 502 may be spaced apart from each other by differing amounts. That is, the oversampled PSF population 500 may have non-uniform sample spacing. Such non-linear sample spacing may cause problems when performing further analysis on the oversampled PSF to further characterize the imaging system 112.

Accordingly, in embodiments, once an oversampled PSF population is formed via performance of the method 400, the imaging system 112 may re-sample or interpolate the oversampled PSF population to provide uniform spacing. In embodiments, the imaging system 112 may generate a surface—described herein as a "super-resolution PSF surface"—representing each of the co-registered pixel values. In embodiments, the imaging system 112 utilizes a curve fitting technique (e.g., least squares or an optimization algorithm such as the differential evolution approach described with respect to FIG. 4) to define a surface that satisfies an objective function with respect to the plurality of co-registered pixel values making up the oversampled PSF population. Similar to the objective function described with respect to the method 400, in generating the super-resolution PSF surface, the imaging system 112 may employ a variety of different objective functions (e.g., RMS error) set in accordance with either user preferences (e.g., input by a user) or stored defaults.

Aberrations within the imaging system 112 may have substantial impacts on the shape of the PSF of the imaging system 112, resulting in shape irregularities that do not comply with certain types of surfaces. For example, in certain cases, parametric surfaces assigning a particular distribution to the oversampled PSF population (e.g., a Gaussian function, Bessel function, sine function, or the like) may not accurately reflect the actual shape of the oversampled PSF population (e.g., provide only a first order approximation thereof) and the resulting super-resolution PSF surface may inaccurately reflect the amplitude and shape (e.g., FWHM) of the oversampled PSF population, leading to inaccuracies in the analyses described in greater detail herein. Accordingly, in embodiments, to generate the super-resolution PSF surface, the imaging system 112 may utilize two-dimensional or three-dimensional interpolation techniques (e.g., cubic spline, bi-linear spline, nearest neighbor, trilinear, tricubic, and the like) to define a non-parametric surface satisfying the objective function as the super-resolution PSF surface.

Figure 6A:
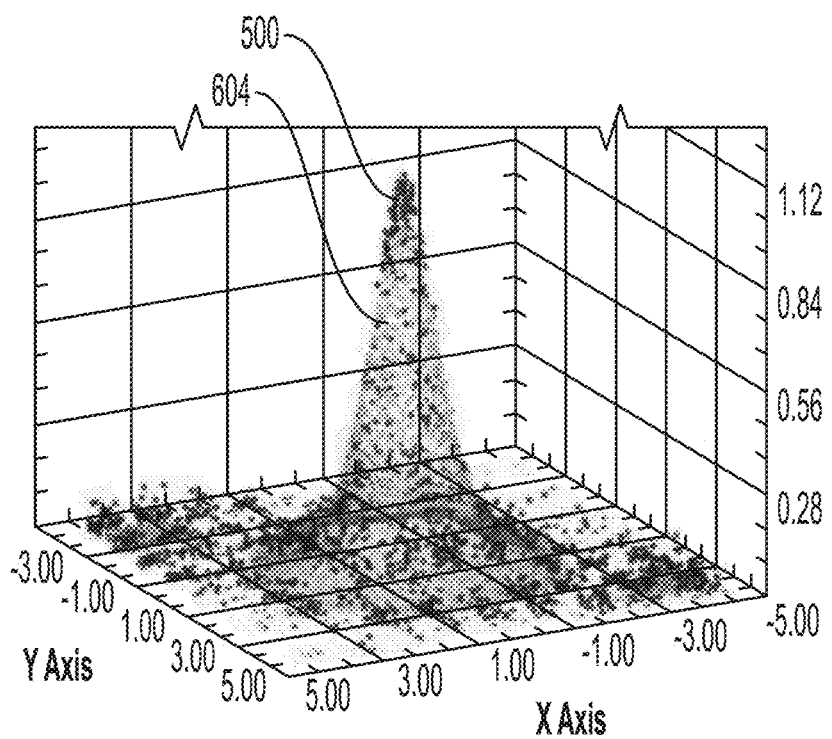
FIG. 6A depicts a super-resolution PSF surface generating using the oversampled PSF population depicted in FIG. 5, according to one or more embodiments described herein.
Figure 6B:
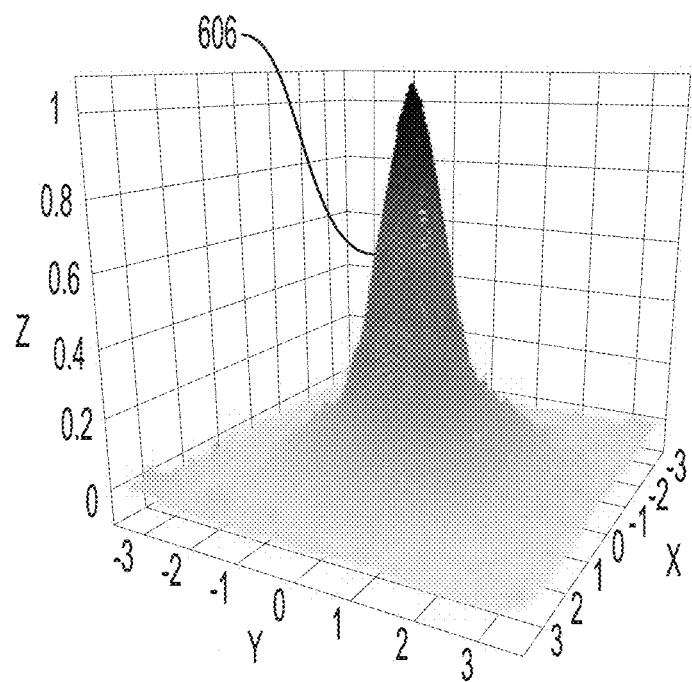
FIG. 6B depicts another super-resolution PSF surface generating using the oversampled PSF population depicted in FIG. 5, according to one or more embodiments described herein.

FIG. 6A depicts an example super-resolution PSF surface 604 fit to the oversampled PSF population 500 described with respect to FIG. 5. The PSF surface 604 was generated by computing an average of two-dimensional cubic spline across each of the co-registered PSF samples of the oversampled PSF population 500. As shown, the super-resolution PSF surface 604 obtained through the cubic spline averaging largely approximates the oversampled PSF population 500 in shape, but slightly deviates from the oversampled PSF population 500 in magnitude due to the averaging. FIG. 6B depicts another super-resolution PSF surface 606 fit to the oversampled PSF population 500 described with respect to FIG. 5. The super-resolution PSF surface 608 was obtained using a direct 3D interpolation of the over-sampled PSF population 500 by using a linear interpolation scheme. The super-resolution PSF surface 606 more accurately reflects the oversampled PSF population 500 in terms of magnitude than the super-resolution PSF surface 604 of FIG. 6A. While the examples described with respect to FIGS. 6A and 6B indicate that cubic spline averaging and direct 3D interpolation may be used, any suitable interpolation technique may be used consistent with the present disclosure.

Figure 7A:
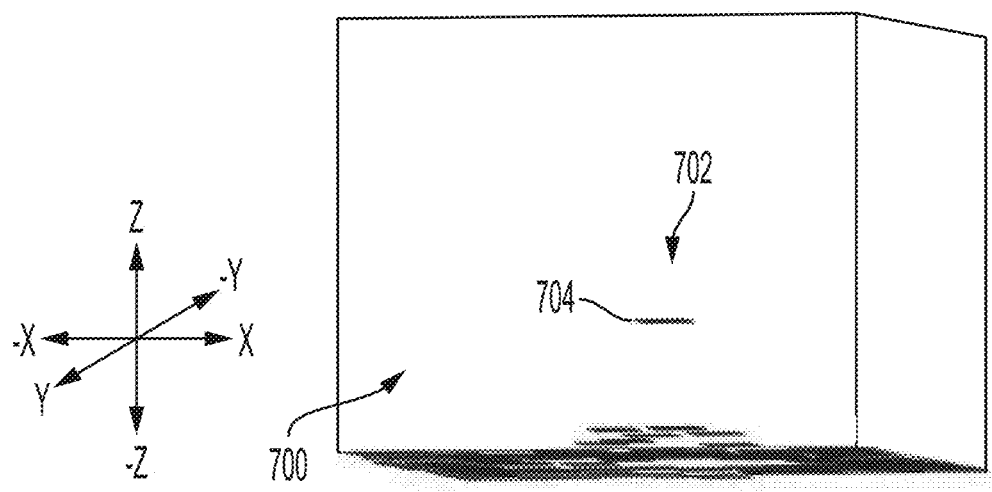
FIG. 7A depicts an oversampled PSF population where each pixel value has been expanded to a grid of points, according to one or more embodiments described herein.
Figure 7B:
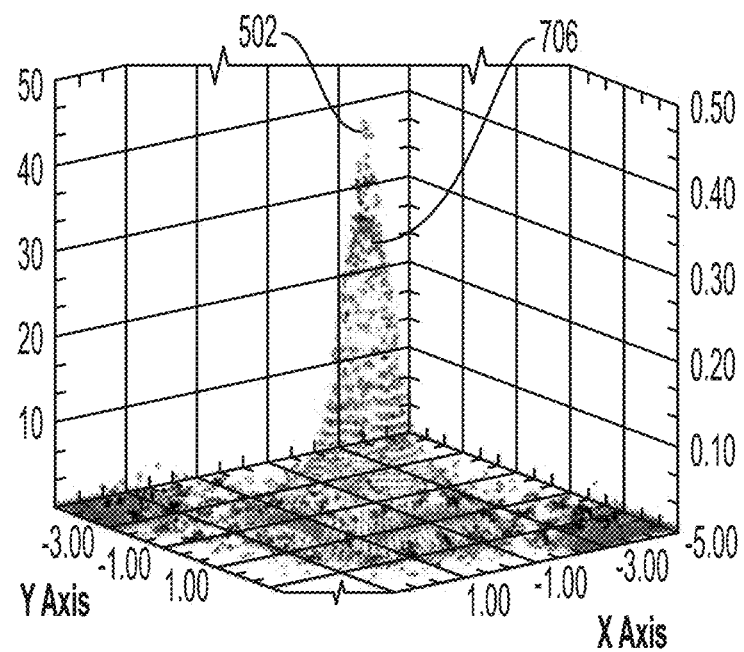
FIG. 7B depicts a resampled oversampled PSF population having uniform spacing generated via the oversampled PSF population depicted in FIG. 7A, according to one or more embodiments described herein.

While generation of a super-resolution PSF surface through fitting/interpolation techniques is one way to resample an oversampled PSF population to possess uniform spacing, other methods may be employed. For example, FIG. 7A depicts a method where a pixel value 702 of an oversampled PSF population 700 is expanded to a grid of points 704 having that pixel value. In embodiments, the grid of points 704 corresponds to a pixel size of the pixel array 116. A particular point in space within a uniform mesh grid of the oversampled PSF population 700 may have a plurality of overlapping pixel values (e.g., at the sample X and Y coordinate values in the depicted (X,Y,Z coordinate space). Thus, with each pixel value 702 expanded to the grid of points 704, each position within the uniform mesh grid may be averaged to generate a re-sampled oversampled PSF population having uniform linear spacing, facilitating additional analysis described herein. FIG. 7B depicts a re-sampled oversampled PSF population 706 generated from the over-sampled PSF population 500 of FIG. 5 using the method described with respect to FIG. 7A. While the re-sampled oversampled PSF population 706 possesses linear uniform spacing, the averaging results in a magnitude offset. The method described with respect to FIG. 7A may provide a rough characterization of the imaging system 112 using minimal computational power.

One beneficial aspect of the images of the PSF of the imaging system 112 described herein (e.g., oversampled PSF populations generated via performance of the method 400 and super-resolution PSF surfaces generated therefrom) is that they maintain features of the actually acquired signals (e.g., asymmetry, shoulders, ringing). That is, the PSF images accurately reflect the actual intensity measurements generated by the detector 114. Given this, oversampled PSF population or super-resolution PSF surfaces generated via the methods described herein may be used to directly assess the performance of the imaging system 112 in the context of resolution and Rayleigh criteria. Such an approach is beneficial over existing techniques relying on measuring imaging system responses of multiple point sources to determine resolution and Rayliegh criteria.

Figure 8A:
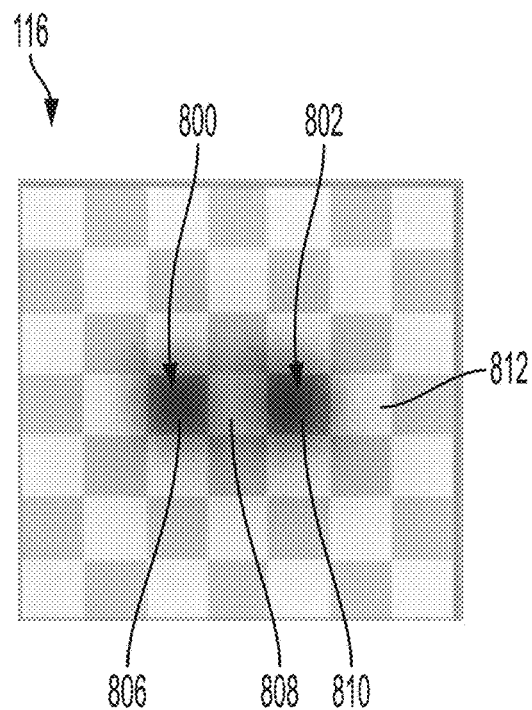
FIG. 8A depicts the pixel array of FIG. 1A with two point illumination signals incident thereon in a first alignment, according to one or more embodiments described herein.
Figure 8B:
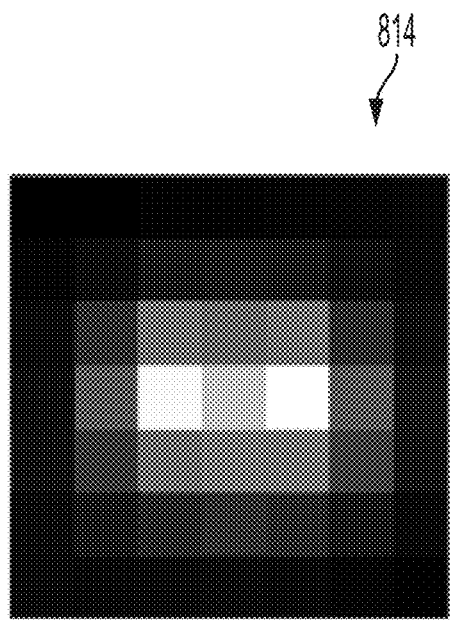
FIG. 8B depicts an image generated from the point illumination signals having the first alignment with the pixel array depicted in FIG. 8A, according to one or more embodiments described herein.
Figure 8C:
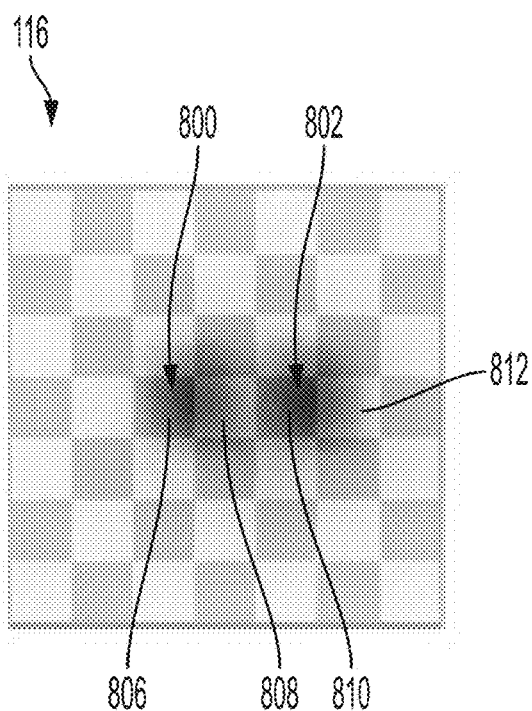
FIG. 8C depicts the pixel array of FIG. 1A with two point illumination signals incident thereon in a second alignment, according to one or more embodiments described herein.
Figure 8D:
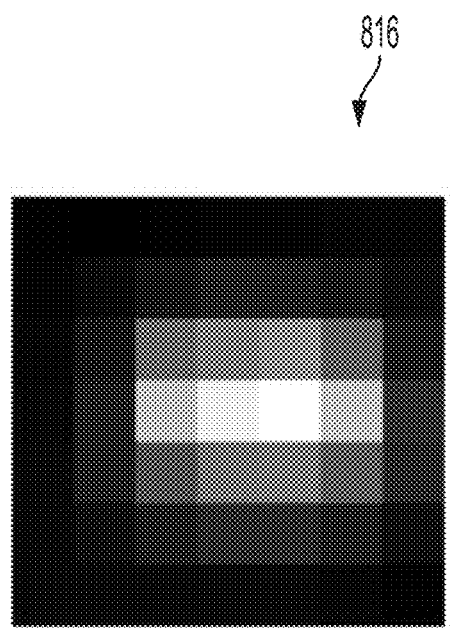
FIG. 8D depicts an image generated from the point illumination signals having the second alignment with the pixel array depicted in FIG. 8C, according to one or more embodiments described herein.

The difficulty in using multiple point sources in evaluating a resolution of the imaging system 112 may be understood with reference to FIGS. 8A-8D. FIG. 8A depicts a first PSF signal 800 and a second PSF signal 802 primarily incident on first, second, and third pixels 806, 808, and 810 of the pixel array 116. As shown in FIG. 8A, the first PSF signal 800 is aligned with the pixel array 116 such that the first PSF signal 800 is substantially centered with respect to the first pixel 806 and the second PSF signal 802 is aligned with the pixel array 116 such that the second PSF signal 802 is substantially centered with respect to the second pixel 808. FIG. 8B depicts a resulting image 814 generated via the detector 114 from the first and second PSF signals 800 and 802 being incident thereon as shown in FIG. 8A. As shown, the first and second PSF signals 800 and 802 are resolvable from one another, indicating that the imaging system 112 is capable of resolving objects separated by the distance between the PSF signals 800 and 802. As shown in FIG. 8C, the first PSF signal 800 is aligned with the pixel array 116 such that the first PSF signal 800 is divided between the first pixel 806 and the second pixel 808; and the second PSF signal 802 is aligned with the pixel array 116 such that the second PSF signal 802 is divided between the third pixel 810 and a fourth pixel 812 of the pixel array 116. FIG. 8D depicts a resulting image 816 generated via the detector 114 from the first and second PSF signals 800 and 802 being incident thereon as shown in FIG. 8C. As shown, the PSF signals 800 and 802 are not separable from one another in the image 816, suggesting that the minimum resolvable distance of the imaging system 112 is greater than the separation of the PSF signals 800 and 802.

The preceding example illustrates the impact of signal alignment on measurements of resolving power of the imaging system 112 when multiple point sources are used. Pixel phasing may impact the results of the measurements, leading to inconsistent results and prevent one from gaining a complete understanding of actual imaging system performance. The images of the PSF of the imaging system 112 described herein beneficially avoid such phasing effects associated with multiple point source signal measurements.

Referring now to FIG. 9, a flow diagram of a method 900 of generating a directional characterization of an imaging system is shown, according to an example embodiment. Performance of the method 900 may be facilitated by performance of the preceding methods herein to evaluate the performance of the imaging system 112 for various performance metrics to generate a comprehensive understanding of the performance of the imaging system 112 in terms of resolution.

In a step 902, the imaging system 112 generates a high resolution image of the PSF thereof (e.g., a PSF image). In embodiments, the imaging system 112 may perform the method 400 described herein with respect to FIG. 4 to generate an oversampled PSF population comprising a plurality of co-registered pixel values. In embodiments, the imaging system 112 resamples the oversampled PSF population to generate the PSF image. In embodiments, the imaging system 112 may generate a super-resolution PSF surface as described herein with respect to FIGS. 6A and 6B as the PSF image. While the method 900 may be performed using an oversampled PSF population with non-uniform sample spacing, evaluation for certain resolution metrics described herein may be facilitated by the uniform, linear spacing rendered available by a super-resolution PSF surface. In embodiments, the imaging system 112 may perform the method described herein with respect to FIGS. 7A and 7B to generate a resampled oversampled PSF population having uniform spacing. As such, the high resolution image of the may take a variety of forms, including, but not limited to, an oversampled PSF population, a super-resolution PSF image, and a resampled oversampled PSF population.

Figure 9A:
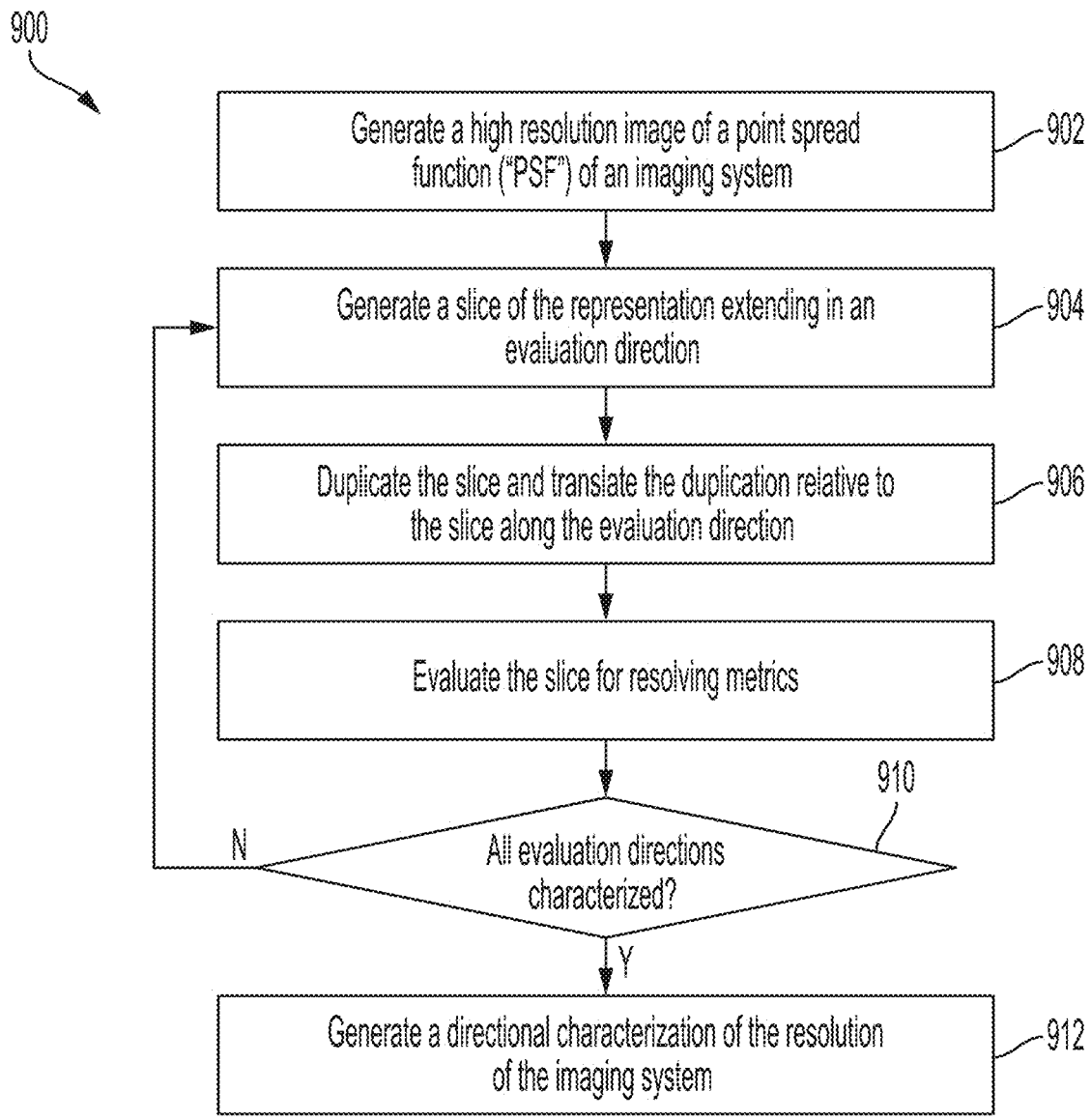
FIG. 9A depicts a flow diagram of a method of generating a directional characterization of a resolution of an imaging system, according to one or more embodiments described herein.
Figure 9B:
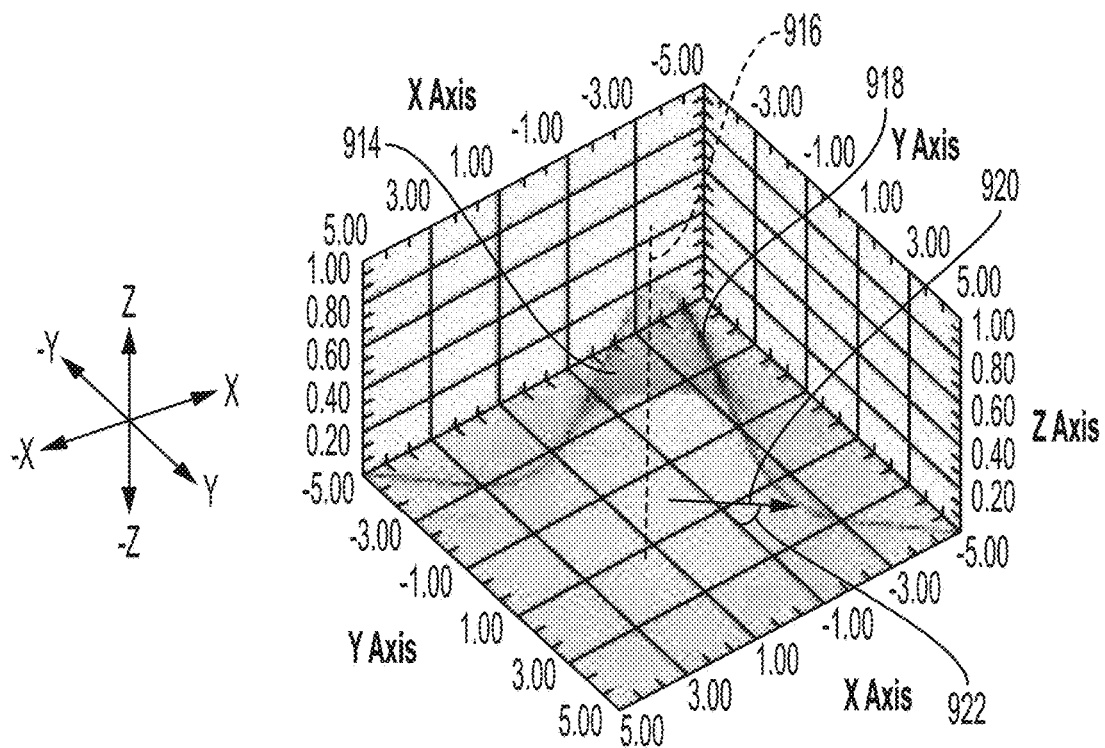
FIG. 9B depicts an angular slice of a super-resolution PSF surface generated from an oversampled PSF population of the imaging system being evaluated during performance of the method depicted in FIG. 9A, according to one or more embodiments described herein.

In a step 904, the imaging system 112 generates a slice of the image of the PSF generated in the step 902, the slice extending in an evaluation direction. In embodiments, the slice represents a cross-section of the image along a line extending in the evaluation direction. For example, FIG. 9B depicts a PSF surface 914 generated from an oversampled PSF population (e.g., generated via performance of the method 400 described herein). The PSF surface 914 has an axis 916 extending through a peak thereof in the magnitude direction (e.g., the Z-direction). An angular slice 918 is generated by taking a cross-section of the PSF surface 914 along through the peak along an evaluation direction 920. The evaluation direction 920 extends at an angle 922 (e.g., an azimuthal angle) relative to a direction perpendicular to the axis 916 (e.g., the Y-direction). That is, the angular slice 918 represents a cross-sectional shape of the PSF surface 914 along the evaluation direction 920.

Figure 9C:
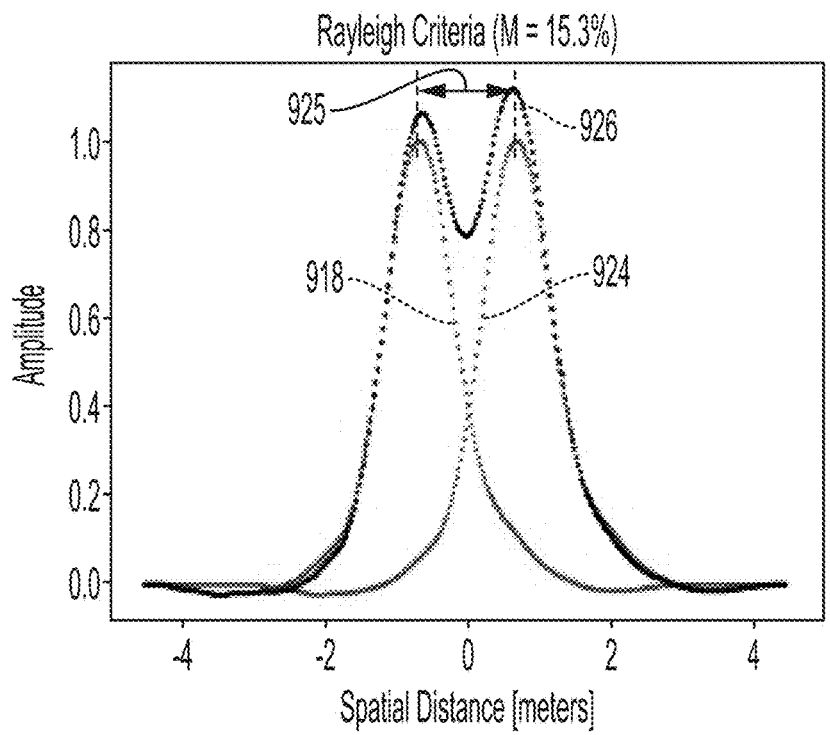
FIG. 9C depicts the angular slice of FIG. 9B translated along an evaluation direction with respect to a duplicate thereof for evaluating a resolution metric along the evaluation direction, according to one or more embodiments described herein.

In a step 906, the imaging system 112 duplicates the slice and translates the slice relative to the slice generated in the step 904 along the evaluation direction. For example, FIG. 9C depicts the angular slice 918 described with respect to FIG. 9B and a duplicate 924. The entirety of the duplicate 924 is translated relative to the angular slice 918 along the evaluation direction along which the slice was generated from the PSF surface 914.

In a step 908, using the slice and the duplicate, the imaging system 112 evaluates the slice for resolving metrics. In embodiments, the imaging system 112 evaluates for at least one resolving metric along the evaluation direction selected from a ground sample distance, a Rayleigh diffraction limit, a ground resolvable distance, Rayleigh resolution criteria, a Sparrow limit, and a FWHM of the PSF. Certain resolving metrics may not rely on the duplicate generated in the step 906. In an example, the Rayleigh diffraction limit may be defined for an unrestricted circular aperture as:

$$RDL = 1.22 \frac{\lambda}{D} \quad (3)$$

where D is the diameter of the circular aperture and wavelength $\lambda$ represents an average wavelength of point sources incident on the imaging system 112. The Rayleigh diffraction limit represents an angular separation between point sources necessary for the point sources to be resolved from another for a diffraction limited system.

When multiple sources are incident on the detector 114 of the imaging system 112 the amplitude modulation of the sensor responses to the must be considered, as both point sources may emit energy that is incident on the same pixel on the detector 114. The amplitude modulation M may be calculated as:

$$M = \frac{J_{max} - J_{min}}{J_{max} + J_{min}} \quad (4)$$

where $J_{max}$ and $J_{min}$ are the maximum and minimums of the combined response of the detector 114 to both point sources, respectively. Equation 4 represents the contrast in the image signal between the two point illumination sources, and is accurate in a non-diffraction-limited case. For the case of an unobstructed circular aperture, the Rayleigh criterion are satisfied when M in accordance with equation 4 equals 15.3%. Such a number may be used in a non-diffraction-limited case to approximate the ground resolvable distance of the imaging system 112. FIG. 9C depicts an example where the angular slice 918 and duplicate 924 are translated relative to each other by a distance 925 along the evaluation direction 920 described with respect to FIG. 9B. The translated duplicates are summed together to generate a combined response 926, which is evaluated in accordance with equation 4. FIG. 9C depicts an example where the distance 925 is selected such that evaluation of equation 4 yields a value of 15.3%, indicating that the distance 925 is a minimal distance satisfying the Rayleigh diffraction limit. For the case relatively large sensor heights, the distance 925 may be multiplied by a height H of the imaging system 112 above the reflector array 104 to determine a ground resolution distance. As such, in this example, a directionally-dependent resolution characteristic of the imaging system 112 is generated by determining the minimum distance 925 that a duplicate is translated relative to the angular slice 918 to yield a combined response 926 satisfying the Rayleigh criteria. Additional resolution criteria may be evaluated in accordance with a similar procedure.

In a step 910, the imaging system 112 determines whether all evaluation directions have been characterized. For example, in embodiments, the image of the PSF may be characterized over a range of evaluation directions (e.g., with the angle 922 described with respect to FIG. 9B taking a plurality of values). For example, in embodiments, the imaging system 112 evaluates the resolving power with the angle 922 varying between 0 degrees to 360 degrees at a fixed angular increment (e.g., 0.01 degrees to 5 degrees) to generate an angular distribution of each resolving metric calculated for each evaluation direction. Accordingly, if not all evaluation directions have not been characterized, the method 900 may revert back to the step 904, alter the angle 922 of the evaluation direction, and repeat the steps 906 and 908 to generate additional directionally-dependent values for the resolving metrics. Such a process may repeat until all desired evaluation directions have been characterized.

After all evaluation directions have been characterized, in a step 912, the imaging system 112 generates a directional characterization of the resolution thereof. In embodiments, only a single evaluation direction is evaluated and the directional characterization may correspond to the distance 925 described with respect to FIG. 9C. In embodiments, the imaging system 112 outputs a characterization incorporating results of in a plurality of different evaluation directions. Such a characterization may be described herein as an "imager fingerprint."

Figure 9D:
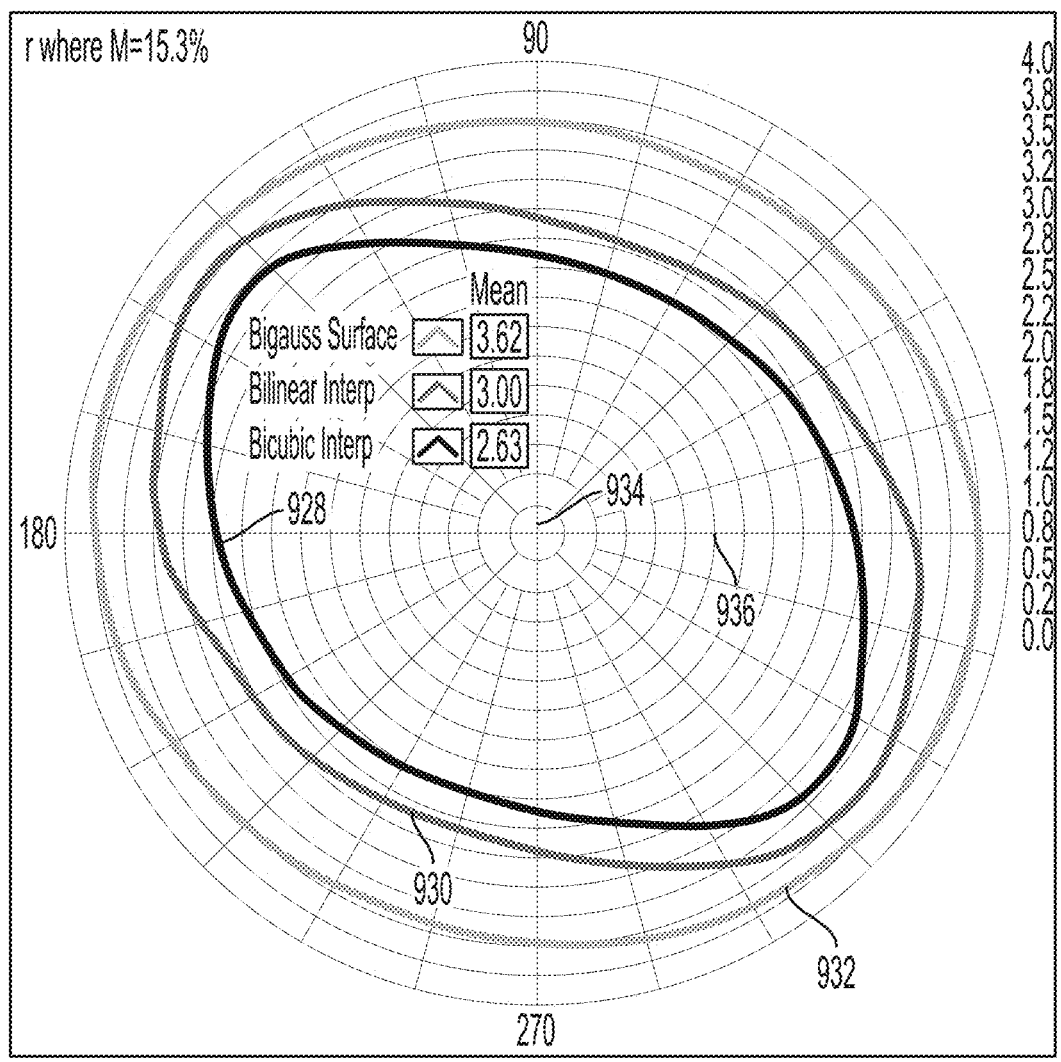
FIG. 9D depicts a chart including imager fingerprints generated via the method depicted in FIG. 9A, according to one or more embodiments described herein.

FIG. 9D depicts an example directional characterization of the imaging system 112 that may result from performance of the method 900. FIG. 9D depicts a first imager fingerprint 928 generated by performing the method 900 where the image of the PSF imaging system was a super-resolution PSF surface generated from bi-cubic interpolation. The first imager fingerprint 928 was generated by slicing the PSF surface along a plurality of evaluation directions and evaluating each slice for the Rayleigh diffraction limit (e.g., using equation 4 above). The distance of the first imager fingerprint 928 from the center 934 of the plot represents the magnitude of the separation of PSF slice which satisfies the Rayleigh diffraction limit criterion (M=15.3%) as a function of angle from the first axis 936 (e.g., representing the angle 922 described with respect to FIG. 9C). FIG. 9D depicts a second imager fingerprint 930 generated using a similar procedure from a super-resolution PSF surface generated by bi-linear interpolation and a third imager fingerprint 932 generated from a super-resolution PSF surface generated by curve fitting an oversampled PSF population to a bi-Gaussian surface. The mean value of the first imager fingerprint 928 (e.g., the mean of all of the Rayleigh diffraction limit criterion separation values across all evaluation directions) is 2.63 meters. The mean value of the second imager fingerprint 930 was 3.0 meters. The mean value of the third imager fingerprint 932 was 3.62 meters. The mean value provides a single number that incorporates all of the characterizations of the imaging system. The mean values may be compared to a diffraction limited case (e.g., represented in equation 3 above) to determine a quality of the imaging system 112 (e.g., the closer the value is to one, the higher quality factor of the imaging system 112). Thus, the method 900 facilitates characterizing the imaging system 112 in real time based on a unique shape of the PSF thereof.

Figures 10A, 10B, 10C, 10D:
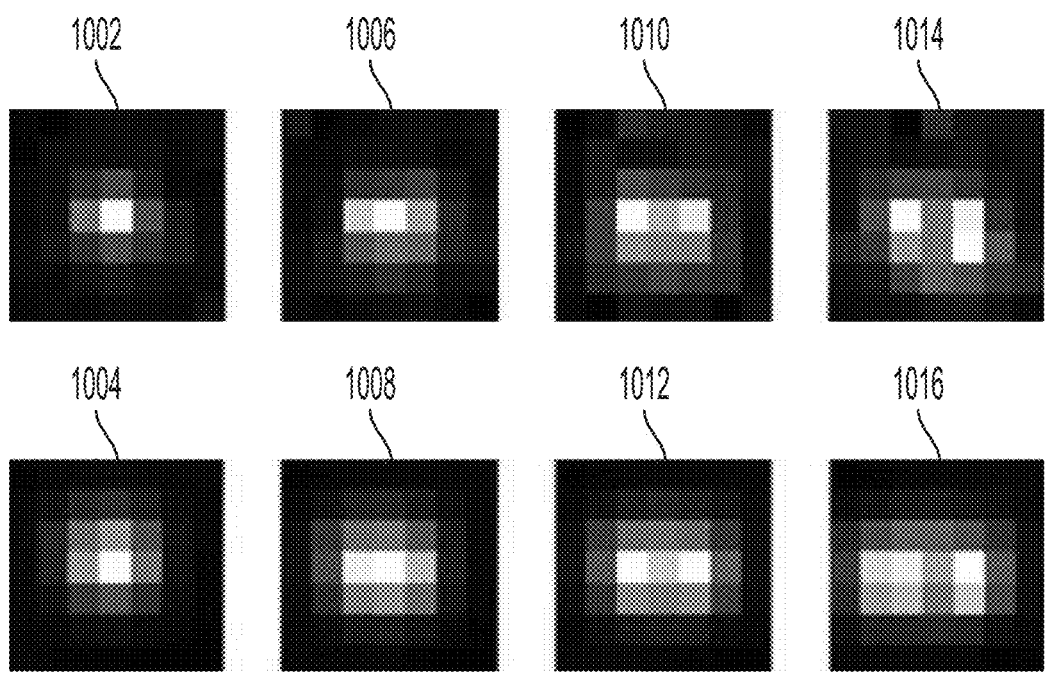
FIG. 10A depicts a first actual image generated by an imaging system with two point illumination sources being separated by a first distance in an evaluation direction and a first simulated image generated by simulating duplicate images of a simulated point source being incident on a detector of the imaging system separated by the first distance, according to one or more embodiments described herein.
FIG. 10B depicts a second actual image generated by an imaging system with two point illumination sources being separated by a second distance in an evaluation direction and a second simulated image generated by simulating duplicate images of a simulated being incident on a detector of the imaging system separated by the second distance, according to one or more embodiments described herein.
FIG. 10C depicts a third actual image generated by an imaging system with two point illumination sources being separated by a third distance in an evaluation direction and a third simulated image generated by simulating duplicate images of a simulated point source being incident on a detector of the imaging system separated by the third distance, according to one or more embodiments described herein.
FIG. 10D depicts a fourth actual image generated by an imaging system with two point illumination sources being separated by a fourth distance in an evaluation direction and a fourth simulated image generated by simulating duplicate images of a simulated point source being incident on a detector of the imaging system separated by the fourth distance, according to one or more embodiments described herein.

To evaluate the accuracy of the imager resolution characterization techniques, the imaging system 112 was characterized via performance of the methods 400 and 900 described herein to generate a super-resolution PSF surface representing the PSF of the imaging system 112 and characterize the resolving power thereof. The super-resolution PSF surface was duplicated, and the duplicate was then translated with respect to the original (e.g., in a manner similar to the angular slice 918 described with respect to FIGS. 9B and 9C) in an evaluation direction by a plurality of distances, and then sub-sampled to the level of the detector 114 to produce a plurality of simulated images. Actual images were then obtained by separating actual point illumination sources (e.g., from the reflector array 104) by the plurality of distances and imaging the point illumination sources. FIGS. 10A and 10B depict the results. FIG. 10A depicts a first actual image 1002 and a first simulated image 1004 with the point illumination sources (or super-resolution PSF surfaces in the case of the first simulated image 1004) separated by a distance of 1.0 m. FIG. 10B depicts a second actual image 1006 and a second simulated image 1008 with the point illumination sources separated by a distance of 1.5 m. FIG. 10C depicts a third actual image 1010 and a third simulated image 1012 with the point illumination sources separated by a distance of 2.0 m. FIG. 10D depicts a fourth actual image 1014 and a fourth simulated image 1016 with the point illumination sources separated by a distance of 2.5 m.

As shown, in comparing the actual images 1002, 1006, 1010, and 1014 with the simulated images 1004, 1008, 1012, and 1016, the simulated results accurately predicts the resolving power of the imaging system 112, as both sets of images indicate a minimum resolvable distance of approximately 2.0 m. Slight differences between the real and simulated images result from misalignment between the illumination source 102, the reflector array 104, and the imaging system 112 during the capturing of the actual images. Additionally, noise and background radiation may impact the actual images. Techniques for generated simulated images from the PSF images described herein may also be refined to generate better agreement between actual and simulated results. In embodiments, the imaging system employs a convolutional neural network approach which builds an algorithm using training data sets of PSF images and actual image results to generate image simulations from a particular PSF.

Figure 11:
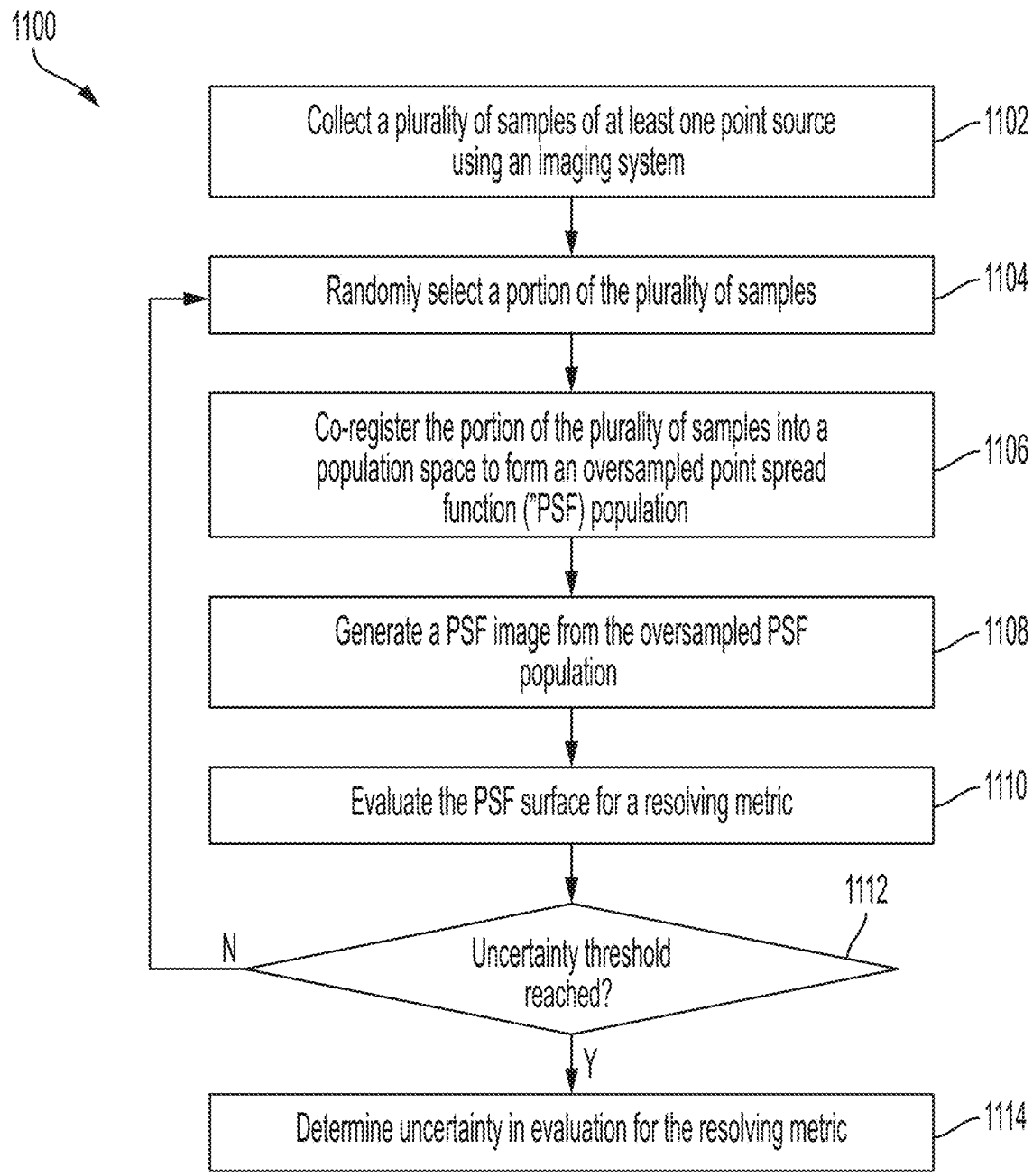
FIG. 11 depicts a flow diagram of a method of determining an uncertainty of a resolving metric of an imaging system, according to one or more embodiments described herein.

Referring now to FIG. 11, a flow diagram of a method 1100 of determining an uncertainty in a resolving metric measured via the methods described herein is shown. The method 1100 may be performed by the imaging system 112 to, for example, determine an uncertainty associated with a resolution metric (e.g., a ground resolvable distance) determined via the method 900 described herein. Such uncertainty measurements are beneficial because the results of the calculations may be sensitive to a variety of different factors, including the number of PSF samples used to form an oversampled PSF population, environmental conditions, alignment between the imaging system 112 and the reflector array 104 during measurement, and the like.

In a step 1102, the imaging system 112 collects a plurality of samples of at least one point source (e.g., PSF samples). The step 1102 may be substantially similar to the step 402 described herein with respect to FIG. 4, where a plurality of frames of at least one of the reflectors 200 of at least one reflector array 1104 reflecting light to the imaging system 112 are taken to generate the plurality of samples. It should be understood that any number of samples may be taken, though in certain embodiments, the number of samples is greater than or equal to 25 samples (e.g., greater than or equal to 100, greater than or equal to 200, greater than or equal to 500, and so on).

In a step 1104, the imaging system 112 randomly selects a portion of the plurality of samples collected during the step 1102. In embodiments, the imaging system 112 randomly selects a predetermined fixed number of the samples (e.g., 25). In a step 1106, the imaging system 112 co-registers the portion of the plurality of samples to form an oversampled PSF population. In embodiments, the step 1106 corresponds to the performance of the method 400 described herein with respect to FIG. 4. In a step 1108, the imaging system 112 generates a PSF image for the oversampled PSF population generated from the randomly selected portion of the samples. As described herein, the imaging system 112 may use any curve fitting, interpolation, or resampling technique to generate the PSF image that comprises a plurality of uniformly distributed co-registered samples from the randomly selected portion of the samples.

In a step 1110, the PSF surface is evaluated for a resolving metric. In embodiments, the step 1110 largely corresponds to performance of the method 900 described herein with respect to FIG. 9A. For example, in embodiments, a plurality of iterations the method 900 is performed for the PSF image generated in the step 1108 to measure a ground resolvable distance of the imaging system based on equation 4 in a plurality of different evaluation directions, and the results are averaged to obtain a first mean ground resolvable distance $GRD_1$. The step 1112 is a decision block where the imaging system 112 determines whether an uncertainty threshold has been reached. In embodiments, the uncertainty threshold is an iteration cap and, if the iteration cap has not been meet, the imaging system 112 reverts back to the step 1104 to randomly select an additional portion of the plurality of samples, and repeats the steps 1106, 1108, and 1110 to evaluate the PSF image generated from the additional portion of the plurality of samples for the resolving metric.

In embodiments, the uncertainty threshold is a statistical measurement of the variation in the resolving metric values determined with each PSF surface. For example, in embodiments, the imaging system 112 computes a standard deviation of the resolving metric and compares the standard deviation with a threshold. If the standard deviation is greater than the threshold, the method may revert back to the step 1104 to perform an additional iteration. Such a process may repeat until the uncertainty threshold is met. As such, in an example, a plurality of ground resolvable distance values $GRD_1 \ldots GRD_n$ may be measured for the imaging system 112. Once the uncertainty threshold is met, the imaging system 112 determines an uncertainty in the resolving metric in a step 1114. In embodiments, the uncertainty corresponds to the statistical measurement used to evaluate the uncertainty threshold in the step 1112. As such, the imaging system 112 may output a standard deviation of the plurality of values for the resolving metric. In an example, the imaging system 112 performed 20 iterations of the method 1100 by randomly selecting 25 samples from an overall sample population for each iteration. The mean value for the GRD was determined to be 1.295 meters with a standard deviation percentage between 2% and 3%.

Figure 12:
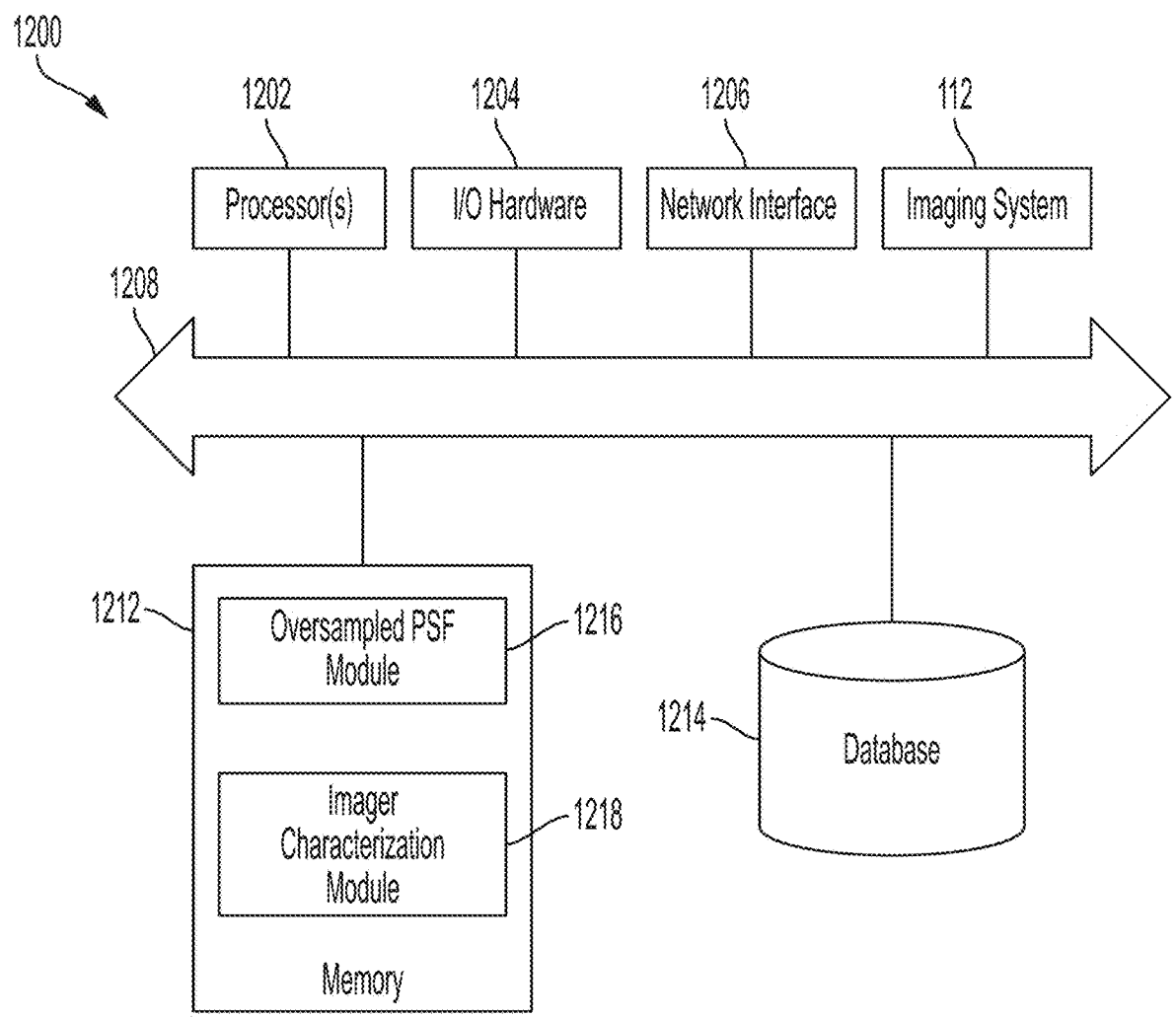
FIG. 12 schematically depicts an image processing system, according to one or more embodiments described herein.

Referring now to FIG. 12, an example embodiment an image processing system 1200 is depicted. The image processing system 1200 includes a processor 1202, input/output ("I/O") hardware 1204, a network interface 1206, a communications bus 1208, a memory 1212, and a database 1214. The image processing system 1200 is shown to include the imaging system 112 described with respect to FIG. 1A. In embodiments, the image processing system 1200 is incorporated into the imaging system 112 described herein and is configured to perform the various computational actions in the methods described herein. It should be appreciated that, in embodiments, at least a portion the image processing system 1200 is separate from the imaging system 112. For example, the imaging system 112 may communicate image data to an external computing system (e.g., via the network interface 1206 or a component similar thereto) and the external computing system may perform actions of the methods described herein. Any of the computational actions described herein other than physically measuring image signals from the detector 114 may be performed either internal to the imaging system 112 or externally thereto consistent with the present disclosure. In embodiments, the image processing system 1200 is associated with the control system 106 described herein with respect to FIG. 1A.

While the image processing system 1200 is shown to include a single processor 1202, it should be appreciated that the image processing system 1200 may include any number of processors depending on the implementation. The processor 1202 can include any suitable processing device, such as a microprocessor, microcontroller, integrated circuit, logic device, and/or other suitable processing device. In embodiments, the processor 1202 is a processing circuit (e.g., either a single processing circuit or a group processing circuit) that executes some or all of the machine-readable instructions from multiple modules of one or more non-transitory computer-readable mediums (e.g., the memory 1212).

I/O hardware 1204 may include at least one element to receive inputs from a user and/or provide results of the computations performed via the image processing system 1200 to a user. For example, in embodiments, the I/O hardware 1204 may include a basic input/output system (BIOS) that interacts with hardware of the image processing system 1200, device drivers that interact with particular devices of the image processing system 1200, one or more operating systems, user applications, background services, background applications, and the like. The network interface 1206 can include any suitable components for interfacing with one or more network(s), including for example, transmitters, receivers, ports, controllers, antennas, and/or other suitable components. The network interface 1206 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The database 1214 may generally comprise a data storage component communicably coupled to the processor 1202 via the communication bus 1208. As a non-limiting example, the database 1214 may include one or more database servers that support NoSQL, MySQL, Oracle, SQL Server, NewSQL, and/or the like.

The memory 1212 is communicatively coupled to the processor 1202. As a non-limiting example, the memory 1212 may comprise one or more non-transitory computer-readable medium that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. Memory 1212 may store instructions accessible to the processor 1202 via an addressing scheme such that the processor 1202 may access the memory 1212 to execute the instructions in accordance with a program to perform any of the functions and operations described herein.

The memory 1212 is shown to include an oversampled PSF module 1216 and an imager characterization module 1218, though it should be understood that any number of modules and combinations thereof may perform any of the computational actions described herein. The oversampled PSF module 1216 may facilitate performance of the method 400 described herein with respect to FIG. 4 and generate a plurality of co-registered pixel values from a plurality of PSF samples. Additionally, the oversampled PSF module 1216 may generate a PSF image from the oversampled PSF population using the techniques described herein. The imager characterization module 1218 may facilitate performance of the method 900 described herein with respect to FIG. 9A to evaluate the imaging system 112 for resolution criteria using the PSF images (e.g., the oversampled PSF population and the PSF surface) generated via the oversampled PSF module 1216. The imager characterization module 1218 may also facilitate performance of the method 1100 described herein with respect to FIG. 11 to assess an uncertainty of the resolution metrics.

As will be understood from the foregoing description, the resolving power of an imaging system may be characterized during deployment of the imaging system by generating an oversampled PSF population that accurately reflects the conditional state of imaging optics therein. The oversampled PSF population may be generated by co-registering a plurality of pixel values from a plurality of PSF samples using an optimization technique that allows surface parameters to float to the pixel values of each of the PSF samples to define a surface establishing a location, amplitude, and background noise associated with each PSF sample such that samples can be co-located in a manner that accurately reflects the data collected in each sample. The oversampled PSF sample population is resampled (e.g., via generation of a super-resolution PSF sample) to uniform spacing, duplicated, sliced, and evaluated for resolution criteria in a directionally-dependent manner such that the resolving power of the imaging system is assessed in a manner that accounts for the three-dimensional shape of the PSF of the imaging system. Two-dimensional depictions of the directional-dependency of the resolving power may be provided to uniquely characterize the imager fingerprint of the imaging system. Such characterization facilitates better understanding of the performance of the imaging system, provides a mode of comparison of the performance of the imaging system to other systems, allows tracking of the imaging system's performance over time, and facilitates the creation of more precise image correction algorithms based on measured PSF irregularities.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of characterizing an imaging system, the method comprising:
generating a plurality of point spread function ("PSF") samples using the imaging system by directing illumination light to the imaging system via a reflector that comprises a mirror array containing a plurality of mirrors, each PSF sample representing a response of an imaging system to a point illumination source, each PSF sample comprising one or more pixel values;
tracking an orientation of a source of the illumination light relative the mirror array;
orienting the plurality of mirrors to reflect the illumination light into the field of view of the imaging system;
co-registering the pixel values contained in each of the plurality of PSF samples to form an oversampled PSF population;
resampling the oversampled PSF population to uniform spacing to form a PSF image;
slicing the PSF image in an evaluation direction to form a slice of the PSF image; and
evaluating the slice to determine a value of a resolution metric of the imaging system that is specific to the evaluation direction.

2. The method according to claim 1, further comprising:
slicing the PSF image in a plurality of additional evaluation directions to form a plurality of additional slices of the PSF surface; and
evaluating each of the plurality of additional slices to determine a plurality of additional values of the resolution metric specific to each of the plurality of evaluation directions.

3. The method according to claim 2, further comprising plotting the plurality of additional values relative to the evaluation direction to generate a two-dimensional imager fingerprint of the imaging system.

4. The method according to claim 2, further comprising computing a ratio of an average of the values to a diffraction-limited value to determine a real-time image quality of the imaging system.

5. The method according to claim 1, wherein the reflector is of a sub-pixel size within a field of view of the imaging system.

6. The method according to claim 1, wherein co-registering the pixel values contained in each of the plurality of PSF samples comprises:
defining a plurality of surface parameters defining a model surface for each of the plurality of PSF samples;
determining values for each of the plurality of surface parameters for each of the plurality of PSF samples to generate a specific model surface for each of the plurality of PSF samples that satisfies an objective function; and
based on each of the specific model surfaces, co-locating each of the plurality of PSF samples relative to a reference point and normalizing each of the plurality of PSF samples relative to amplitude.

7. The method according to claim 6, wherein:
each of the one or more pixel values associated with each PSF sample is associated with a pixel area of the imaging system; and
the determining values for each of the plurality of surface parameters comprises updating values for each of the plurality of surface parameters for each PSF sample using an optimization algorithm to determine values for each of the plurality of surface parameters that satisfies the objective function by fitting a surface within any location of each pixel area.

8. The method according to claim 1, wherein the resolution metric comprises a ground resolvable distance of the imaging system.

9. The method according to claim 1, further comprising determining an uncertainty in the evaluation method by generating an additional PSF image from an additional oversampled PSF population, slicing the PSF image in the evaluation direction to form a slice of the additional PSF image, evaluating the slice of the additional PSF image to determine an additional value of the resolution metric, and comparing the value to the additional value.

10. The method according to claim 1, wherein the illumination source comprises sunlight and the source of the illumination light is the sun.

11. A method of characterizing an imaging system, the method comprising:
generating a point spread function ("PSF") image of an imaging system by directing illumination light to the imaging system via a reflector that comprises a mirror array containing a plurality of mirrors;
tracking an orientation of a source of the illumination light relative the mirror array;
orienting the plurality of mirrors to reflect the illumination light into the field of view of the imaging system;
generating a plurality of slices of the PSF image, each of the plurality of slices extending in an evaluation direction that differs from that of the other slices;
evaluating each of the slices by duplicating each of the plurality of slices and translating each slice relative to that slice's duplicate along the evaluation direction associated with that slice to determine a minimum resolvable distance of the imaging system along the evaluation direction; and
plotting the minimum resolvable distance as a function of evaluation direction to generate an imager fingerprint of the imaging system.

12. The method according to claim 11, wherein minimum resolvable distance comprises a ground resolvable distance of the imaging system.

13. The method according to claim 10, wherein the PSF image comprises a three dimensional surface representing a magnitude of an image signal as a function of location on a pixel array in response to illumination from a point illumination source.

14. The method according to claim 13, wherein generating the plurality of slices comprises generating a cross section of the three-dimensional surface that extends through a peak of the three-dimensional surface along each of the evaluation directions.

15. The method according to claim 11, wherein the generating the PSF image comprises:
generating a plurality of PSF samples using the imaging system, each PSF sample representing a response of an imaging system to a point illumination source, each PSF sample comprising one or more pixel values; and
co-registering the pixel values contained in each of the plurality of PSF samples to form an oversampled PSF population.

16. The method according to claim 15, wherein co-registering the pixel values contained in each of the plurality of PSF samples comprises:
defining a plurality of surface parameters defining a model surface for each of the plurality of PSF samples;
determining values for each of the plurality of surface parameters for each of the plurality of PSF samples to generate a specific model surface for each of the plurality of PSF samples that satisfies an objective function; and
based on each of the specific model surfaces, co-locating each of the plurality of PSF samples relative to a reference point and normalizing each of the plurality of PSF samples relative to amplitude.

17. The method according to claim 11, wherein the illumination source comprises sunlight and the source of the illumination light is the sun.

18. A system comprising:
one or more processors; and
one or more non-transitory memory modules communicatively coupled to the one or more processors and storing machine-readable instructions that, when executed, cause the one or more processors to:
receive a plurality of point spread function ("PSF") samples generated via an imaging system that directs illumination light to the imaging system via a reflector that comprises a mirror array containing a plurality of mirrors, each PSF sample representing a response of an imaging system to a point illumination source, each PSF sample comprising one or more pixel values;
track an orientation of a source of the illumination light relative the mirror array;
orient the plurality of mirrors to reflect the illumination light into the field of view of the imaging system;
co-register the pixel values contained in each of the plurality of PSF samples to form an oversampled PSF population;
resample the oversampled PSF population to uniform spacing to form a PSF image;
slice the PSF image in an evaluation direction to form a slice of the PSF image; and
evaluate the slice to determine a value of a resolution metric of the imaging system that is specific to the evaluation direction.

19. The system according to claim 18, wherein the instructions further cause the processor to
slice the PSF image in a plurality of additional evaluation directions to form a plurality of additional slices of the PSF surface; and
evaluate each of the plurality of additional slices to determine a plurality of additional values of the resolution metric specific to each of the plurality of evaluation directions.

20. The system according to claim 19, wherein the instructions further cause the processor to plot the plurality of additional values relative to the evaluation direction to generate a two-dimensional imager fingerprint of the imaging system.

21. The system according to claim 18, wherein the illumination source comprises sunlight and the source of the illumination light is the sun.

* * * * *